United States Patent [19]

Ishii et al.

[11] Patent Number: 5,598,279
[45] Date of Patent: Jan. 28, 1997

[54] DOCUMENT CIRCULATING APPARATUS WITH AUTOMATIC DELETION OF DATA

[75] Inventors: Rie Ishii, Soka; Masayuki Hayashi, Yokohama; Takeshi Yamakawa, Fujisawa; Hiroyuki Takahashi, Tsurugashima, all of Japan

[73] Assignee: Ricoh Company, Ltd., Tokyo, Japan

[21] Appl. No.: 334,022

[22] Filed: Nov. 2, 1994

[30]     Foreign Application Priority Data

Nov. 2, 1993  [JP]  Japan .................................. 5-274375
Mar. 3, 1994  [JP]  Japan .................................. 6-033810

[51] Int. Cl.⁶ .................................. H04N 1/21; H04N 1/32
[52] U.S. Cl. .................................. 358/402; 358/444
[58] Field of Search .................................. 358/404, 444, 358/403, 407, 402, 468; 395/115

[56]           References Cited

U.S. PATENT DOCUMENTS 4,597,018  6/1986  Sonobe et al. .................................. 395/115
4,907,094  3/1990  Mishima et al. .................................. 358/404
5,125,075  1/1992  Goodale et al. .................................. 395/200
5,220,438  6/1993  Yamamoto .................................. 358/404
5,315,397  5/1994  Inoue et al. .................................. 358/404
5,359,512  10/1994  Nishihara .................................. 364/413.22

FOREIGN PATENT DOCUMENTS 0388093  9/1990  European Pat. Off. .
0564871  10/1993  European Pat. Off. .

*Primary Examiner*—Scott A. Rogers
*Attorney, Agent, or Firm*—Oblon, Spivak, McClelland, Maier & Neustadt, P.C.

[57]           ABSTRACT

An apparatus for circulating documents among a number of computer terminals in an office. The apparatus includes a device for reading images which are then stored. The image may then be read out from the storage. A controller controls the storage of the image and the reading of the image from storage. The apparatus also includes a device for forming a network system with a number of terminals so that the various terminals can read images from storage. The apparatus will automatically delete data from the storage under various conditions.

12 Claims, 26 Drawing Sheets

3 0 3 8

DOCUMENT CIRCULATING APPARATUS WITH AUTOMATIC DELETION OF DATA

BACKGROUND OF THE INVENTION

The present invention relates to a document circulating apparatus applicable to an electronic mail system.

Offices in general are equipped with various kinds of data processing apparatuses, e.g., copiers, printers, facsimile apparatuses and personal computers. The data processing apparatuses deal with circulation documents for the transfer or data, collected data, data to be sent to a different section, data to be stored, etc. However, notebook type personal computers are used in a stand-alone condition and, therefore, cannot be constructed into a network easily. Moreover, most of the documents generated by personal computers are sent in the form of hard copies, so that it is troublesome to, for example, set the environment for direct transmission. Facsimile apparatuses have a problem that users have to walk up to them, and a problem that users are apt to overlook received documents meant for them.

Further, data dealt with in offices flood on desks and are often lost or cannot be distinguished with ease. Since a substantial period of time is necessary for the data to be circulated, it is impossible to read necessary data when such data are required. Persons in offices each copies desired data, increasing the number of papers. Whether or not data are transferred to a person who needs them cannot be determined. It is difficult to assign security to a particular member or to set up a priority order. As the number of times of meeting increases data representing a place, time and so forth get confused. In addition, telephones often force persons to get neighbors and leave messages in an awkward procedure.

SUMMARY OF THE INVENTION

It is, therefore, an object of the present invention to provide a document circulating apparatus easy to operate and supporting the transfer and storage of data.

In accordance with the present invention, a document circulating apparatus has an image reading device, a memory for storing image data and document data, a controller for controlling the memory, a system constructing section for constructing a network system, and an image outputting device. The apparatus automatically deletes, among the image data and the document data stored in the storing means, particular data.

The apparatus of the type described may transfer part of the image data and document data input to the memory to terminals via the network system.

When the apparatus additionally includes an optical disk, it may selectively copy or shift the image data and document data between a memory on the network and the optical disk.

Also, in accordance with the present invention, a document circulating device has an image reading device, a memory for storing image data and document data, a controller for controlling the memory, a system constructing section for constructing a network system, an image outputting device, and a terminal unit connected to the network system and having a function of displaying part of the image data and document data transferred thereto and a function of requesting, if necessary, transfer of all the image data and document data.

Further, in accordance with the present invention, a document circulating apparatus has an image reading device, a memory for storing image data and document data, a controller for controlling the memory, a system constructing section for constructing a network system, an image outputting device, and an OCR section for extracting character data from the output of the image reading device. The apparatus transfers part of the image data and document data to a terminal over the network system.

Moreover, in accordance with the present invention, a document circulating apparatus has an image reading device, an automatic document feeder, a memory for storing image data and document data, a controller for controlling the memory, a system constructing section for constructing a network system, an image outputting device, and an OCR section for extracting character data from the output of the image reading device. The apparatus transfers part of the image data and document image to a terminal over the network system.

In addition, in accordance with the present invention, a document circulating apparatus has an image reading device, a memory for storing image data and document data, a controller for controlling the memory, a system constructing section for constructing a network system, an image outputting device, an OCR section for extracting character data from the output of the image reading device, and an OMR section for extracting a mark. The apparatus transfers part of the image data and document data to a terminal over the network system.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
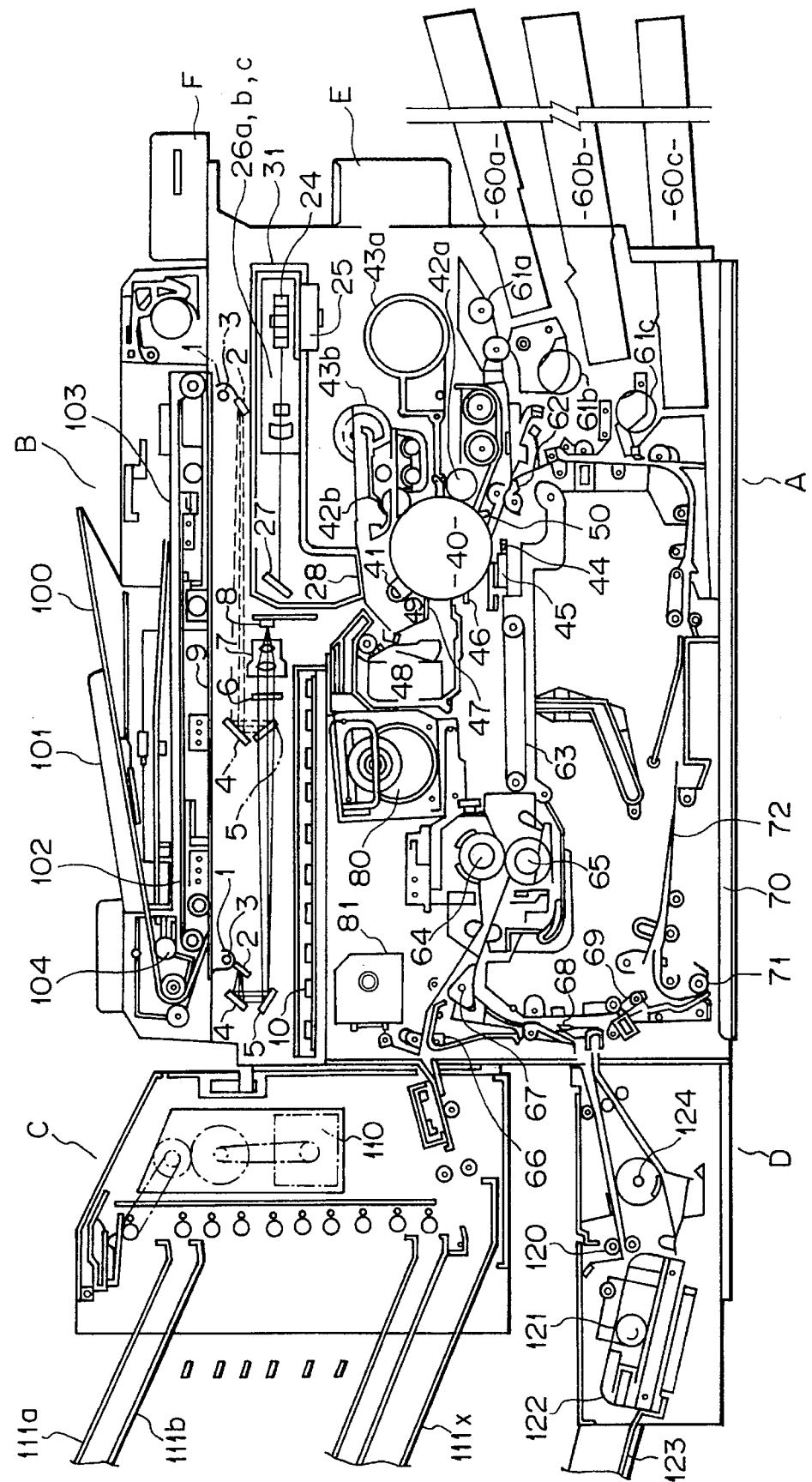
FIG. 1 is a section showing a document circulating apparatus embodying the present invention.
Figure 2:
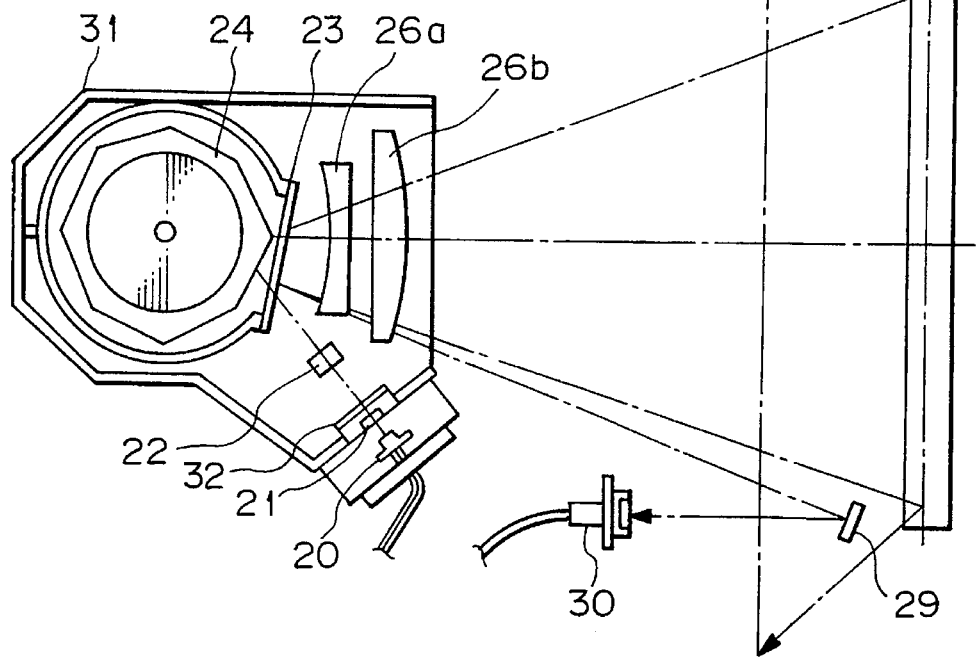
FIGS. 2 and 3 are respectively a plan view and a side elevation showing an optical writing section included in the embodiment.
Figure 3:
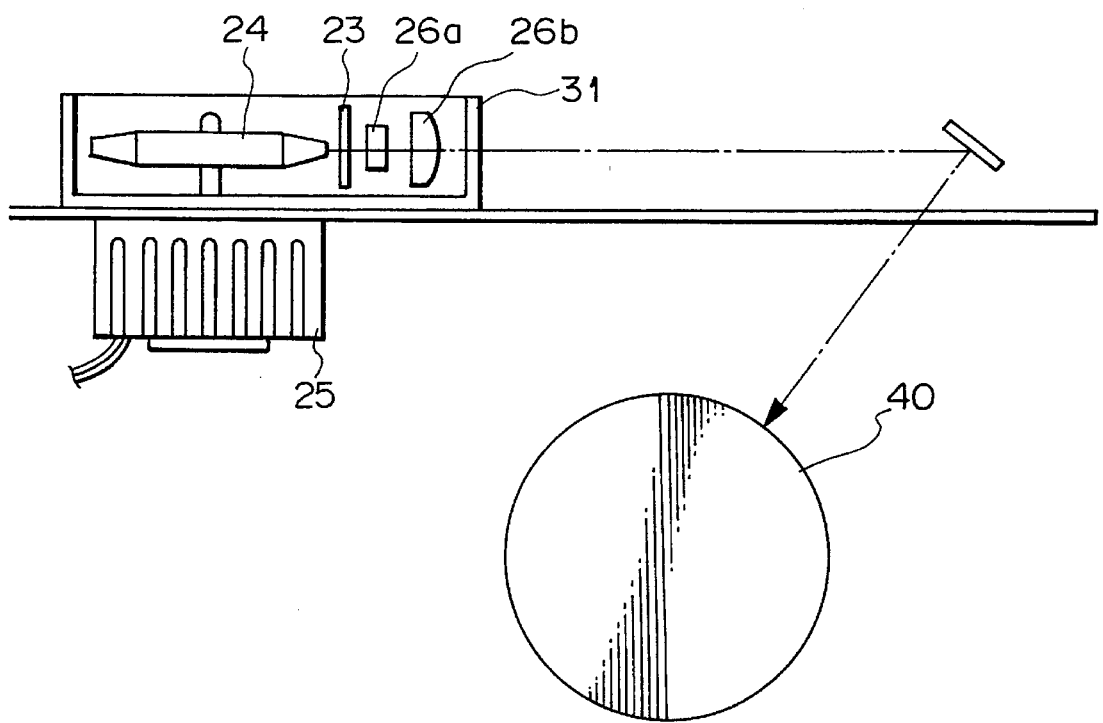

Referring to FIG. 1 of the drawings, a document circulating apparatus embodying the present invention is shown. As shown, the apparatus is generally made up of six units, i.e., an apparatus body A, an ADF (Automatic Document Feeder) 151, a sorter C, a turn-over unit D, a system section E, and an OCR section F. The apparatus body A has a scanner section, a writing section, a photoconductive element section, a developing section, and a sheet feed section.

The various sections mentioned above are constructed and operated as follows.

Scanner Section

A first scanner is loaded with a reflector 1, a light source 3, and a first mirror 2 and movable at a constant speed. A second scanner is loaded with a second mirror 4 and a third mirror 5 and movable at a speed which is one half of the speed of the first scanner. When the first and second scanners optically scan a document, not shown, laid on a glass platen 9, the resulting imagewise reflection from the document is routed through a color filter 6 and a lens 7 to a monodimensional solid state imaging device 8. While the light source 3 is generally implemented by a fluorescent lamp or a halogen lamp, a fluorescent lamp is predominant since it has a stable wavelength and long life. Although the embodiment uses a single light source, two or more light sources may be used. Since the imaging device 8 has a constant sampling clock, the fluorescent lamp 3 should be turned on at a frequency higher than the sampling clock; otherwise, it would adversely effect images.

Generally, the imaging device 8 is implemented by a CCD (Charge Coupled Device) image sensor. The analog image signal from the imaging device 8 is converted to a digital image signal and then subjected to various kinds of image processing (bilevel or multilevel conversion, tonality processing, magnification change, editing, etc.) at an image processing board 10. The resulting digital signal is an aggregation of spots. To produce color image data, the embodiment has a color filter 6 movable into and out of an optical path extending from the document to the imaging device 8, thereby passing only the data of required color. The color filter 6 is moved into or out of the optical path in synchronism with the scanning of the document. Every time the color filter 6 is so moved, a multiplex image transfer function or a duplex copy function enabled to produce various kinds of copies.

Writing Section

The processed image data are written on a photoconductive drum 40 in the form of an aggregation of beam spots by the raster scanning of a laser beam. Specifically, a laser beam issuing from a semiconductor laser 20 is collimated by a collimator lens 21 and then shaped by an aperture 32 to have a predetermined shape. The shaped laser beam is compressed by a first cylinder lens 22 in the subscanning direction and then incident to a polygon mirror 24. The polygon mirror 24, having an accurate polygonal section, is rotated by a polygon motor 25 at a predetermined speed in a predetermined direction. The rotation speed of the polygon mirror 24 is determined by the rotation speed and writing density of the drum 40 and the number of faces of the mirror 24.

The laser beam incident to the polygon mirror 24 is steered by the mirror 24 which is in rotation. The beam from the mirror 24 is sequentially input to f-theta lenses 26a and 26b. The f-theta lenses 26a and 26b convert the scanning beam having a constant angular velocity such that it scans the drum 40 at a constant speed. As a result, the the beam is focused onto the drum 40 as a minimum beam spot. In addition, the f-theta lenses 26a and 26b are provided with a mechanism for compensating for irregularities in the configuration of the polygon mirror 24. The beam passed through these lenses 26a and 26b is steered by a mirror 29 to a synchronizing section 30 located outside of an image region. In the synchronizing section 30, the beam is propagated through an optical fiber to a sensor. After a synchronizing signal indicative of the beginning of a line in the main scanning direction has appeared, one line of image data is output on the elapse of a predetermined period of time. This is repeated to complete a single image.

Photoconductive Element Section

The drum 40 has a photoconductive layer on the periphery thereof. The photoconductive layer may be implemented by an organic photoconductor (OPC), α-Si, Se-Te or similar substance sensitive to a semiconductor laser (wavelength of 780 nm). The embodiment uses an organic photoconductor. Generally, for laser beam writing, there are available a negative-to-positive (N/P) process which illuminates an image portion, and a positive-to-positive (P/P) process which illuminates a background. In the illustrative embodiment, use is made of the N/P process.

A main charger 41 is of the conventional scotorton type having a grid on the drum 40 side. The charger 41 uniformly charges the surface of the drum 40 to negative polarity. The laser beam incident to the charged surface of the drum 40 lowers the potential thereof. As a result, the potential on the surface of the drum 40 becomes −750 V to −800 V in the background or about −500 V in the image portion, forming an electrostatic latent image. A main developing unit 42a and an auxiliary developing unit 42b, to which a bias of −500 V to −600 V is applied, each deposits toner on a developing roller thereof so as to develop the latent image.

Developing Section

In the event of development in black only, the auxiliary developing unit 42b and a toner replenishing unit 43b are removed. A toner replenishing unit 43a is associated with the main developing unit 42a and stores black toner therein. The toner replenishing unit 43b associated with the auxiliary developing unit 42b stores color toner. While a latent image is developed in one color, the main pole of the other developing unit may be changed. The development is combined with the reading of color data, which is effected by the replacement of the color filter 6, and the multiplex image transfer function and duplex copy function available with the sheet transport system. This implements multifunction color copying and color editing. For development in three or more colors, three or more developing units may be arranged around the drum 40, or a revolver accommodating such developing units may be used.

As a sheet is fed in synchronism with the drum 40, the image developed by the developing units 42a and 42b is transferred to the sheet by a transfer charger 44. For this purpose, the transfer charger 44 applies a positive charge to the rear of the sheet. A separation charger 45 constructed integrally with the transfer charger 44 and separates the sheet carrying the image thereon from the drum 40 by an AC discharge. After the image transfer, the toner left on the drum 40 is removed by a cleaning blade 47 and collected in a tank 48. Further, the potential pattern also left on the drum 40 is erased by a discharge lamp 49.

A photosensor 50 is positioned just after the developing position and comprised of a light emitting element and a light-sensitive element. At the writing position, a predetermined pattern, e.g., black or mesh pattern is written to the position of the drum 40 corresponding to the photosensor 50. After the predetermined pattern has been developed, the photosensor 50 determines the reflectance of the developed pattern and that of the other portion of the drum 40. A ratio between these reflectances is indicative of the density of the image. If the density is low, a toner replenish signal is output. When the density does not increase even after the replenishment, it may be determined that the amount of toner is short.

Sheet Feed Section

In the illustrative embodiments, sheet cassettes 60a, 60b and 60c are each loaded with a stack of sheets of particular size. A sheet carrying an image on one side thereof may be passed through a refeed loop 72 for the purpose of duplex copying or refeeing. After one of the cassettes 60a–60c has been selected, a start button is pressed. Then, a pick-up roller 61 (61a, 61b or 61c), adjoining the cassette 60 selected, starts rotating and feeds a sheet until the leading edge of the sheet abuts against a registration roller 61 which is in a halt.

The registration roller 62 starts rotating at a timing matching the image formed on the drum 40, thereby driving the sheet toward the periphery of the drum 40. After the transfer of the image from the drum 40 to the sheet, a separating and conveying section 63 conveys the sheet by sucking it. Subsequently, a heat roller 64 and a pressure roller 65, constituting a fixing unit, fix the toner image on the sheet. In an ordinary copy mode, the sheet coming out of the fixing unit is directed by a path selector 67 toward an outlet communicating to the sorter C. In a multiplex copy mode, the sheet is again guided by path selectors 68 and 69 toward the register roller 62 via the refeed loop 72.

While a duplex copy mode may be selectively implemented only by the apparatus body A or by the combination of the apparatus body A and turn-over unit D, the following description will concentrate on the combination scheme. The sheet steered downward by the path selector 67 is directed further downward by the path selector 68 and then directed by the path selector 69 toward a tray 70 located below the refeed loop 72. A roller 71 turns over the sheet and feeds it in the opposite direction. At this instant, the path selector 69 is so positioned as to steer the sheet to the registration roller 62 via the refeed loop 72.

ADF B

The ADF automatically feeds a stack of documents one by one to the glass platen 9 and drives them out after copying. Specifically, documents are stacked on a table 100 and neatly positioned by side guides 101 in the widthwise direction. A pick-up roller 104 separates one of the documents from the others and feeds it out of the tray 100. A conveyor belt 102 conveys the document to a predetermined position on the glass platen 9. After the document on the glass platen 9 has been copied a desired number of times, it is driven out to a tray 103. It is possible to determine the document size on the basis of the positions of the side guides 101 and by counting the feed time of the document.

Sorter C

The sorter has bins 111a–111x and distributes copies sequentially coming out of the apparatus body A to designated ones of the bins 111a–111x. Specifically, as a plurality of rollers are driven by a motor 110 to feed the consecutive copies, pawls adjoining the inlets of the bins 11 I steer the copies into the associated bins 111.

Turn-Over Unit D

While the apparatus body A can produce only a single two-sided or duplex copy at a time, the turn-over unit D allows a plurality of duplex copies to be produced collectively when combined with the apparatus body A. To produce a plurality of duplex copies collectively, the sheet carrying an image on one side thereof and steered downward by a discharge roller 66 is directed toward the turn-over unit D by the path selector 67. Such sheets are sequentially stacked on a tray 123 by a discharge roller 120. At this instant, a feed roller 121 and a side guide 122 cooperate to neatly arrange the sheets in the vertical and horizontal directions. In the event of rear copying, the sheets are sequentially refed from the tray 123 by a refeed roller 124. At this time, the path selector steers the sheets directly into the refeed loop 72.

There are also shown in FIG. 1 a sound-proof glass 23, a mirror 27, a dust-proof glass 28, a lens retainer unit 31, a sheet separator 46, a main motor 80, and a fan motor 81.

Electric Control Section

Figure 4A:
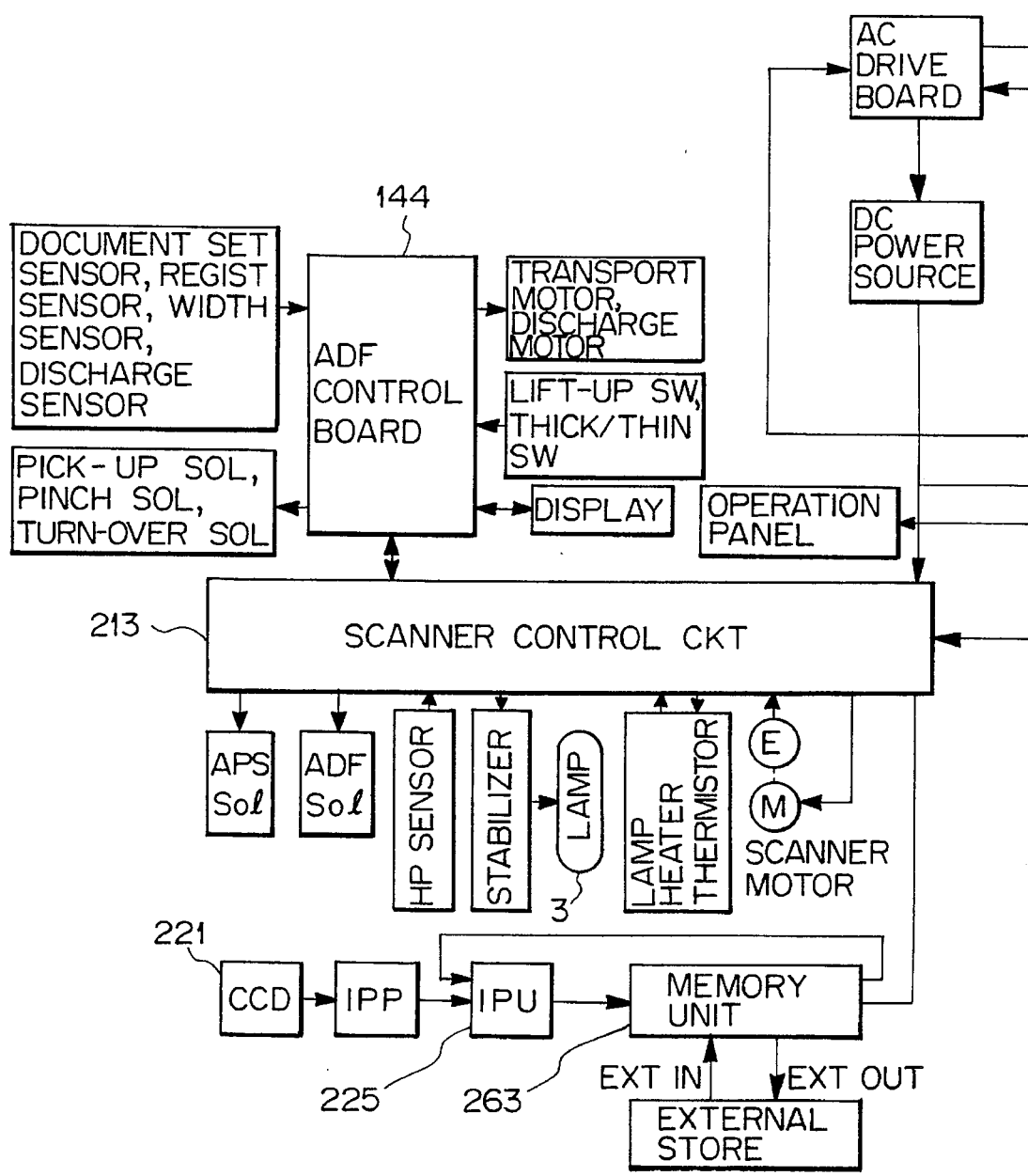
FIG. 4 is a schematic block diagram showing a control unit included in the embodiment.
Figure 4B:
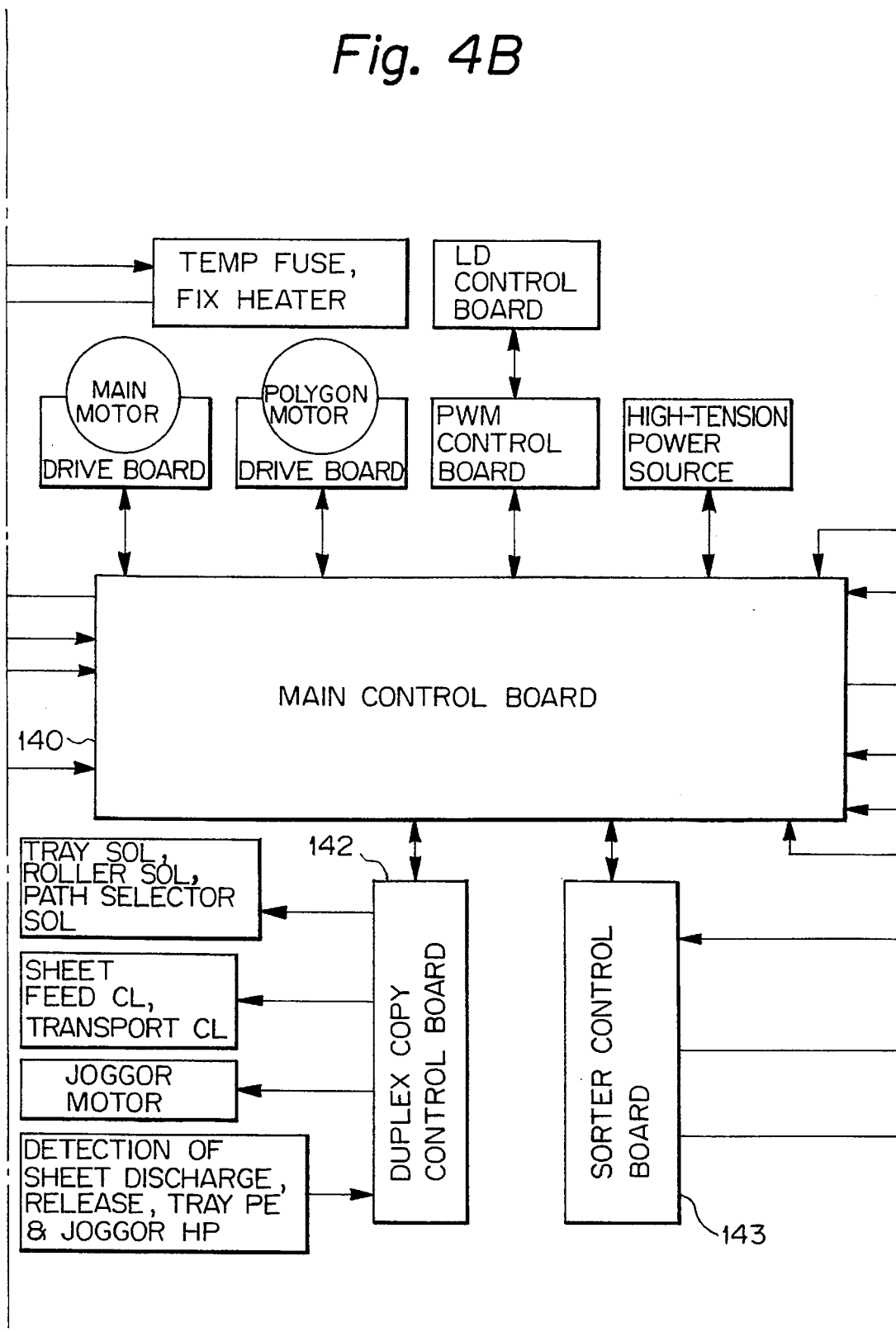
Figure 4C:
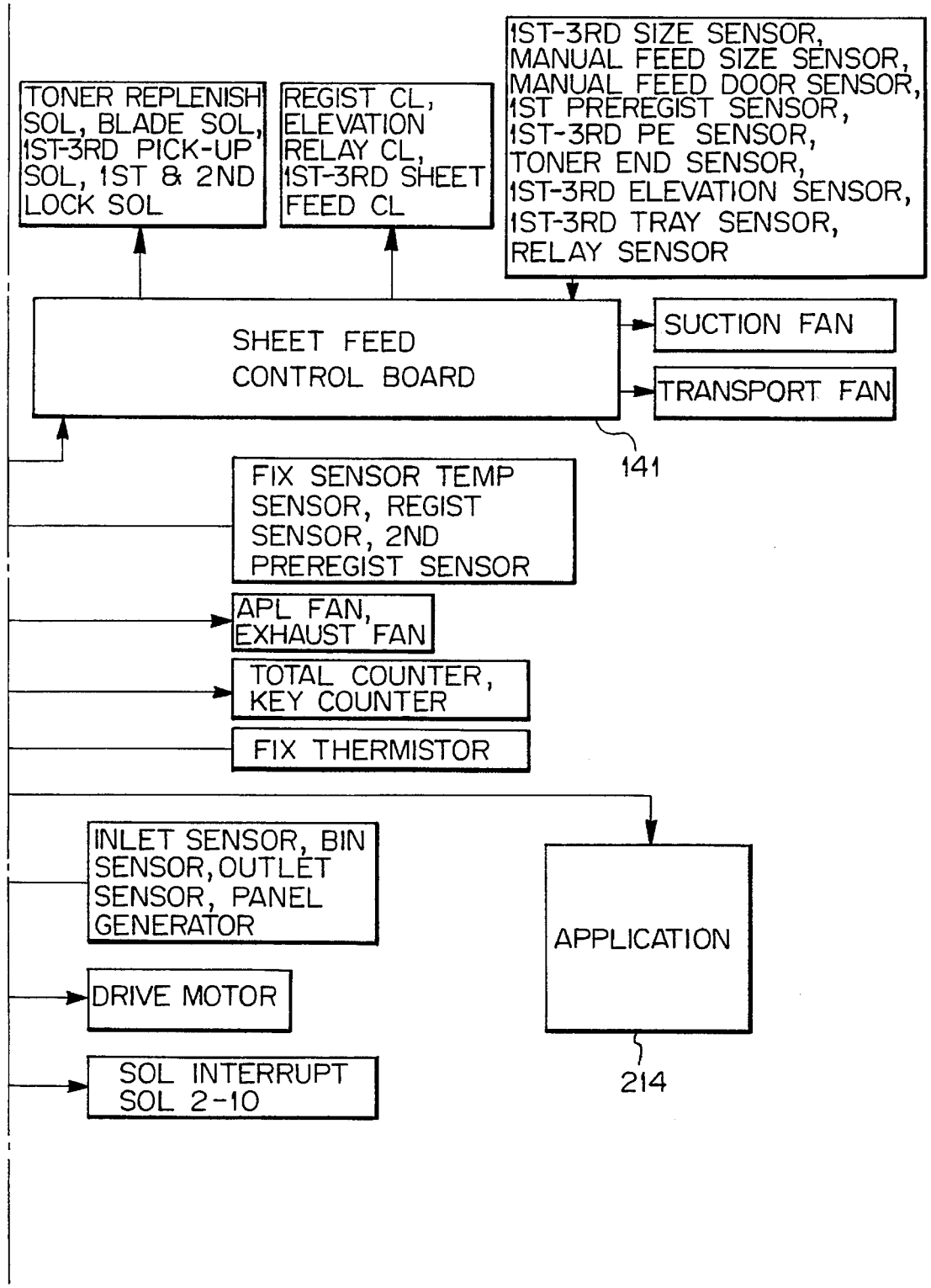
Figure 5:
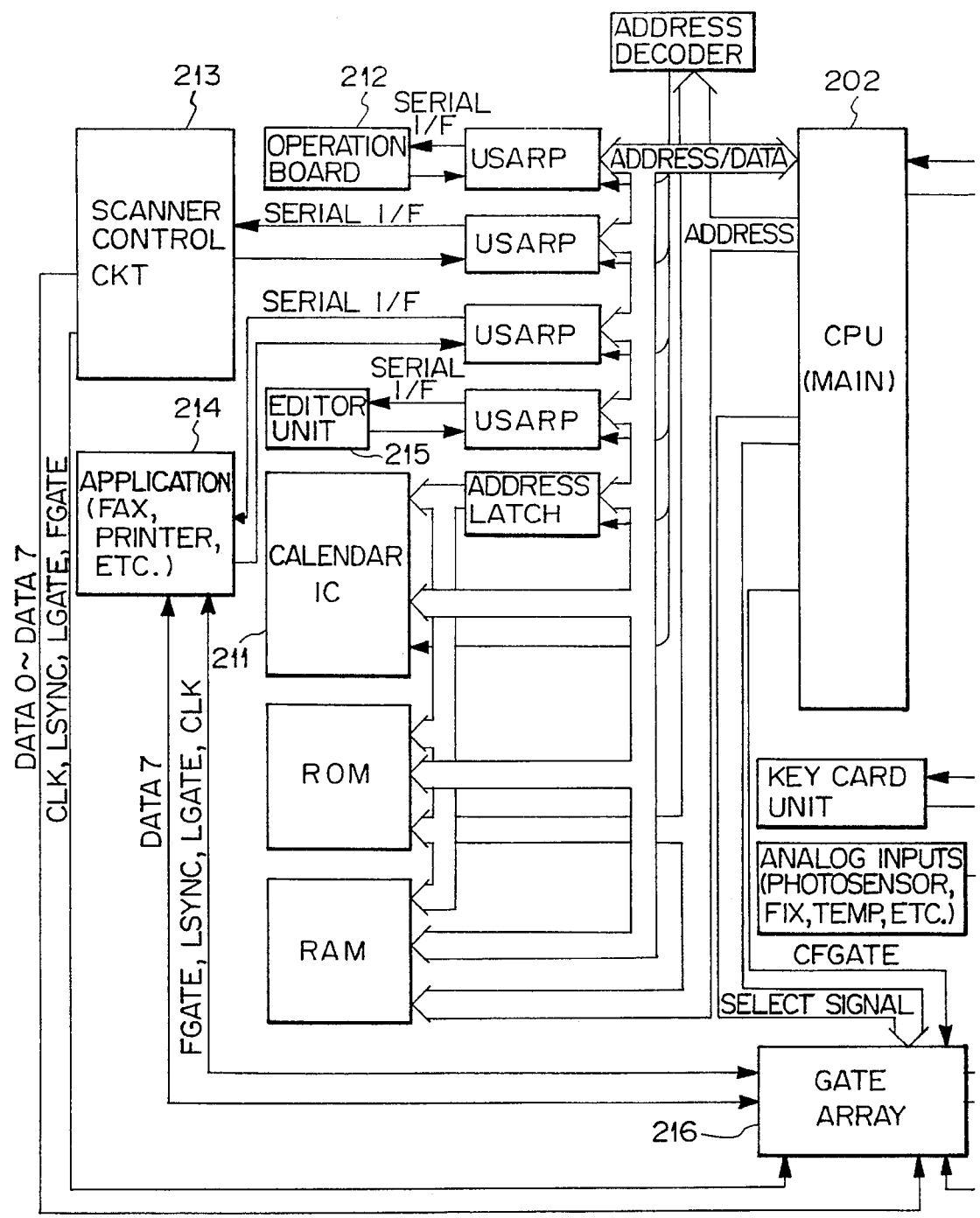
FIGS. 5 and 6 are block diagrams schematically showing, when combined, a more specific arrangement of the control unit.
Figure 6:
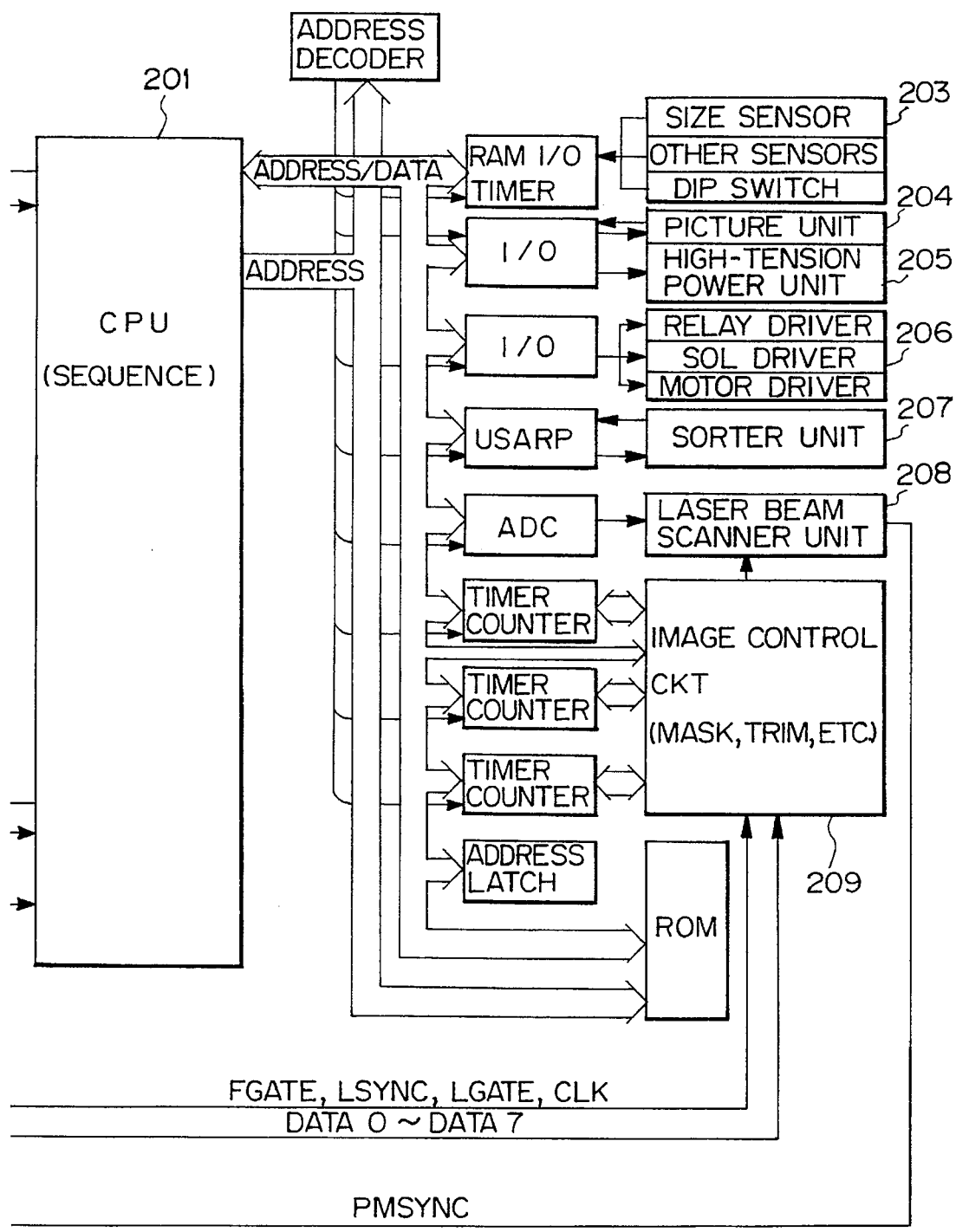

Referring to FIG. 4, a control unit for controlling the entire apparatus has a main control board 140, a sheet feed control board 141, a duplex copy control board 142, a sorter control board 143, an ADF control board 144, and a scanner control circuit 213. The control boards and circuit control sensors and solenoids shown in the figure. The reference numerals 214, 221, 225 and 263 respectively designate an application system, a CCD image sensor, an IPU (Image Processing Unit), and a memory unit. As shown in FIGS. 5 and 6 in detail, the control unit has two CPUs (Central Processing Units), i.e., a sequence control CPU 201 and a main CPU 202 which are respectively assigned to sequence control and operation control. The CPUs 201 and 202 are connected together by a serial interface (RS232C).

The sequence control will be described first. A sequence sets and outputs conditions relating to the sheet transport and image formation. Connected to the sequence control CPU 201 are sensors 203 relating to sheet transport and including size sensors, discharge sensor and registration sensor, a duplex copy unit 204, a high-tension power source unit 205, drivers 206 for driving relays, solenoids and motors, a sorter unit 207, a laser beam scanner unit 208, an image control circuit 209, etc. Regarding the sensors 203, the CPU 201 receives the outputs of size sensors responsive to the size and orientation of sheets and outputting electric signals indicating them, sensors responsive to registration and sheet discharge, sensors responsive to an oil end condition, toner end condition and other supply conditions, and sensors responsive to a door left open, blowing of a fuse and other mechanical errors.

The duplex copy unit 204 includes a motor for regulating the width of sheets, a sheet feed clutch, a solenoid for steering sheets, a sheet presence/absence sensor, a size fence home position sensor for regulating the width of sheets, and sensors relating to sheet transport. The high-tension power source unit 205 applies to each of the main charger, transfer charger, separation charger and bias electrode for development a particular high voltage by a particular duty determined by PWM (Pulse Width Modulation) control. The drivers 206 respectively drive a sheet feed clutch, registration clutch, counter, motor, toner replenishing solenoid, power relay, fixing heat, etc. The CPU 201 is connected to the sorter unit 207 by a serial interface and causes it to convey sheets and discharge them into the bins at a predetermined timing in response to signals from the sequence.

A fixing temperature, photosensor output, laser diode monitor input and laser diode reference voltage are applied to the analog input of the CPU 201. Receiving the output of a thermistor included in the fixing unit, the CPU 201 ON/OFF controls the heater or controls the phase thereof such that the fixing unit remains at a predetermined temperature. A photosensor, or phototransistor, senses a photosensor pattern formed at a predetermined timing and sends the output thereof to the CPU 201. In response, the CPU 201 determines the density of the pattern and then ON/OFF controls a toner replenishing clutch, thereby controlling the toner concentration. Also, the CPU 201 uses the pattern density in detecting a toner end condition.

An analog-to-digital converter (ADC) and the analog input of the CPU 201 are used for maintaining the power of the laser diode constant. Specifically, the monitor voltage when the laser diode is turned on is controlled to a predetermined reference voltage (which is selected such that the laser diode is 3 mw).

The main or operation control CPU 202 controls a plurality of serial ports and a calender IC (Integrated Circuit) 211. Connected to the serial ports are an operation panel 212, a scanner control circuit 213, an application 214, an editor 215 and so forth as well as the sequence control CPU 201. The operation panel 212 has indicators for displaying operator's key inputs and conditions of the copier. The key inputs are reported to the main CPU 202 by serial communication. In response, the CPU 202 determines whether or not to turn on the indicators of the operation panel 212 and then sends the result of decision to the panel 212 by serial communication. As a result, the operation panel 212 turns on or turns off the indicators as instructed by the CPU 202.

The scanner control circuit 213 sends information relating to scanner servo motor drive control and image processing to the main CPU 202 by serial communication. Also, the circuit 213 interfaces the ADF (B), FIG. 1, to the CPU 202. The application 214 interfaces external apparatus, e.g., facsimile apparatus or printer to the CPU 202 and interchanges predetermined information with them. The editor 2 15 is accessible to effect an inputting and editing function. Image editing data (masking, trimming, image shift, etc.) entered by the operator on the editor 215 is sent to the CPU 202 by serial communication. The calender IC 211 stores date and time and can be accessed by the CPU 202, as needed. With the calender IC 211, it is possible to display the current time on the operation panel 212 and to set desired times for turning on and turning off the machine.

The gate array 216 sends, in response to a select signal from the main CPU 202, image data (DATA0–DATA7) and synchronizing signals in any of the following three different directions.

(1) Scanner Control Circuit 213→Image Control Circuit 209

Image signals in the form of eight-bit data (or four-bit or one bit data, if desired) and serially transferred from the scanner are sent to the image control circuit 209 in synchronism with a synchronizing signal PMSYNC from the laser beam scanner unit 208.

(2) Scanner Control Circuit 213→Application 214

Image signals serially sent from the scanner in the form of one-bit data (binary) are output to the application 214 in parallel. The application 214 sends the input image data to a printer or similar output device connected to the apparatus.

(3) Application 214→Image Control Circuit 209

As a facsimile apparatus or similar input device serially inputs image signals in the form of one-bit data (binary) to the application 214, the application transfers them to the image control circuit 209 in synchronism with the synchronizing signal PMSYNC from the laser beam scanner unit 208.

As image signals in the form of one-bit data (binary) are serially input from a facsimile apparatus or similar external input device to the application 214, the application 214 transfers them to the image control circuit 209 in synchronism with the synchronizing signal PMSYNC from the laser beam scanner unit 208.

Figure 7:
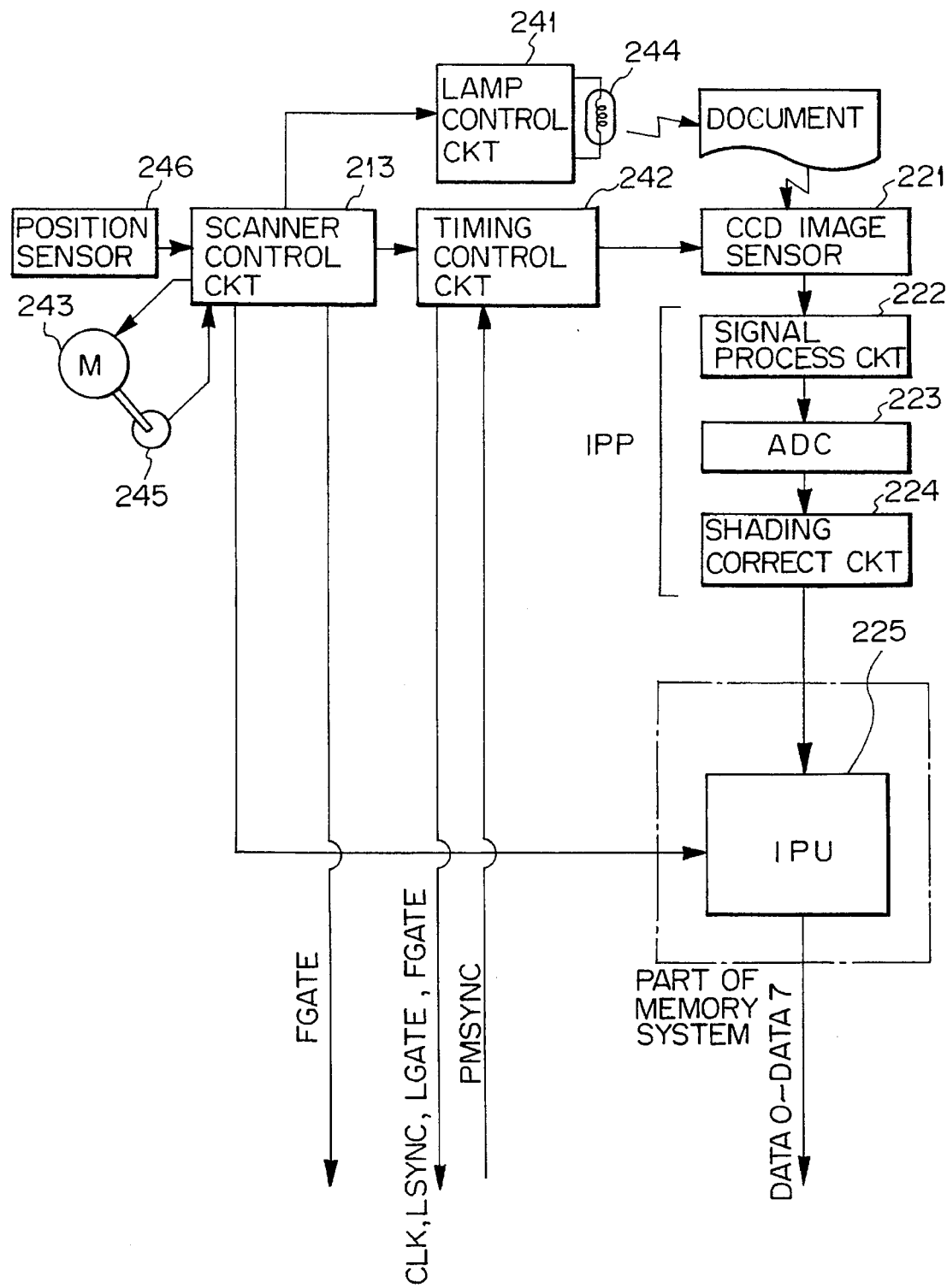
FIG. 7 is a schematic block diagram showing an image scanner section included in the control unit.

As shown in FIG. 7, the analog image signal from the CCD image sensor 221 is applied to a signal processing circuit 222 to be amplified and to have the quantity of light thereof corrected thereby. The output of the signal processing circuit 222 is transformed to a digital multilevel signal from an ADC 223. The digital signal is processed by a shading correction circuit 224 and then input to an IPU (Image Processing Unit) 225.

Figure 8:
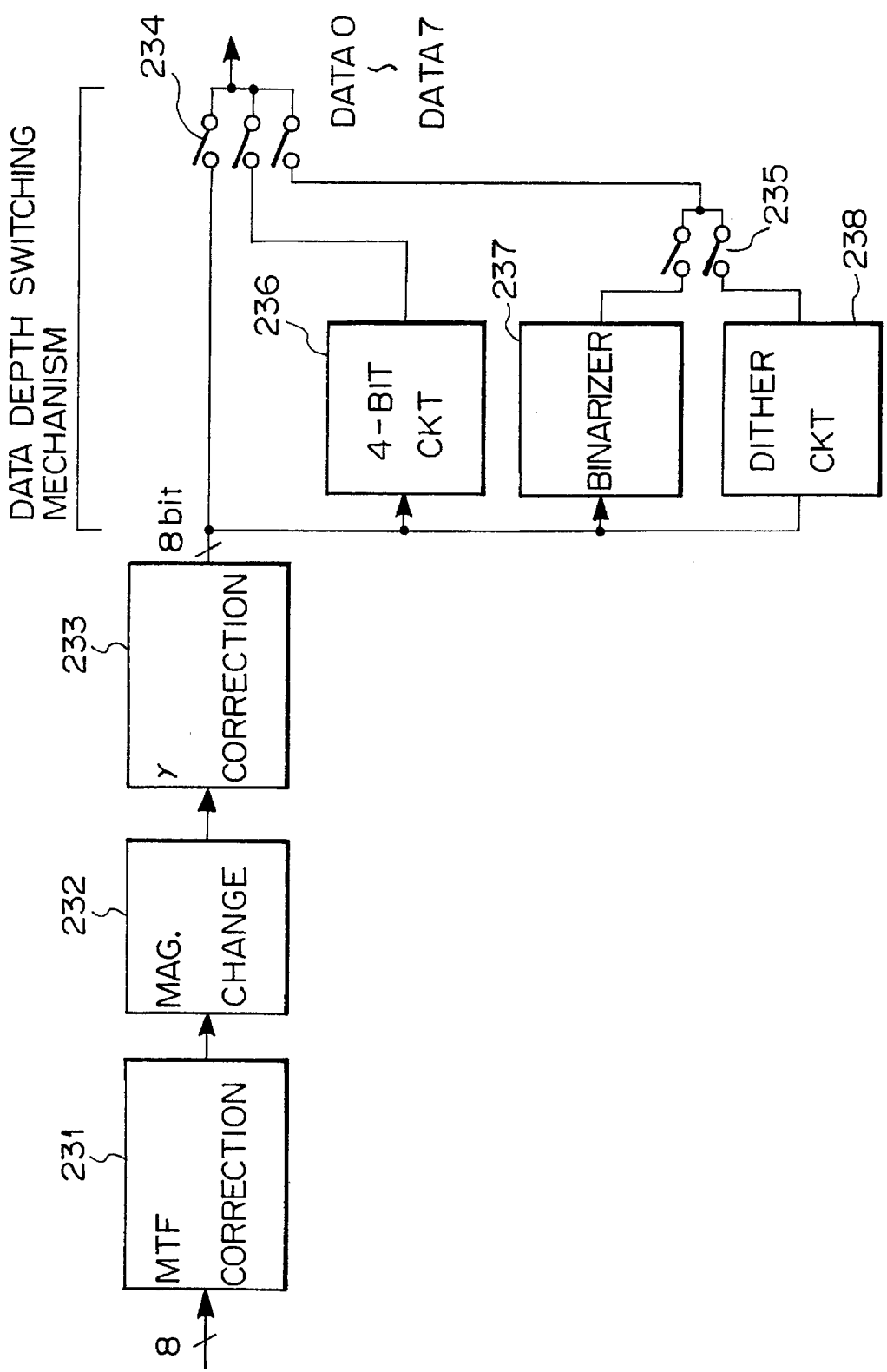
FIG. 8 is a schematic block diagram showing an image processing unit included in the image scanner.

As shown in FIG. 8, the image signal input by the IPU 225 has the high frequency components thereof enhanced by an MTF (Modulation Transfer Function) correction circuit 231, electrically changed in magnification by a magnification change circuit 232, and then applied to a gamma (γ) correction circuit 233. This correction circuit 233 optimizes the input and output characteristic in matching relation to the characteristic of the machine. A data depth switching mechanism has two switches 234 and 235. The switch 234 transforms the image signal from the correction circuit 233 to a predetermined quantization level. The data depth switching mechanism implements three different data types shown in FIG. 9. A four-bit circuit 236 outputs four-bit data. A binarizer 237 binarizes input eight-bit multilevel data to produce binary data, or one-bit data, by use of a predetermined threshold. A dither circuit 238 produces area tonality based on the one-bit data. The switch 234 selects one of the three different data types and outputs it as DATA0–DATA7.

Referring again to FIG. 7, the scanner control circuit 213 controls a lamp stabilizer (lamp control circuit) 241, a timing control circuit 242, an electric magnification change circuit 232 of the IPU 225 (FIG. 8), and a scanner drive motor 243, as instructed by the printer control section. The lamp stabilizer 241 ON/OFF controls the fluorescent lamp 244 and controls the quantity of light to issue from the lamp 244, as instructed by the scanner control circuit 213. A rotary encoder 245 is connected to the output shaft of the scanner drive motor 243. A position sensor 246 senses a reference position assigned to a subscanning drive mechanism. The magnification change circuit 232 effects an electric magnification change according to main scanning magnification data set by the scanner control circuit 213.

The timing control circuit 242 outputs various kinds of signals in response to commands from the scanner control circuit 213. Specifically, when the scanner starts reading a document, the timing control circuit 242 sends to the CCD image sensor 221 a transfer signal for transferring one line of data to a shift register, and shift clock pulses for outputting the data of the shift register one bit at a time. The timing control circuit 242 sends a pixel synchronous clock pulses CLK, main scanning synchronizing pulses LSYNC and main scanning valid period signals LGATE to control units responsive to the image reproducing system. The pixel synchronous clock pulses CLK are substantially identical with the shift clock pulses applied to the CCD image sensor 221. The main scanning synchronizing pulses LSYNC are substantially identical with the signals PMSYNC from the beam sensor of the image writing unit, but they are synchronous to the pixel synchronous clock pulses CLK. The main scanning valid period signal LGATE goes high at the time when the output data (DATA0–DATA7) are regarded as valid data. In the illustrative embodiment, the CCD image sensor 221 outputs 4,800 bits of valid data for each line.

On receiving a read start command from the printer control section, the scanner control circuit 213 turns on the lamp 244, starts driving the scanner drive motor 243, controls the timing control circuit 242, and thereby causes the CCD image sensor 221 to read an image. Further, the scanner control circuit 213 causes a subscanning valid period signal FGATE to go high. The signal FGATE, gone high goes low on the elapse of a period of time necessary for the maximum readable length in the subscanning direction (longitudinal dimension of A4 size in the embodiment) to be scanned.

Figure 9:
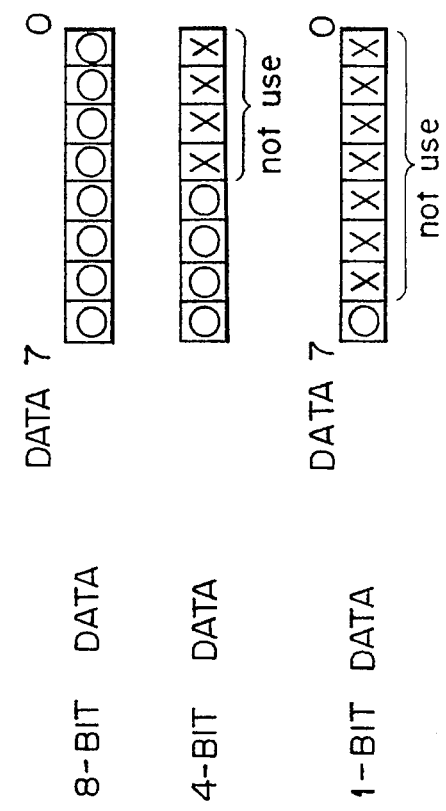
FIG. 9 shows data types selectively output from the image processing unit.

The image signal from the image sensor 221 is output in the form of eight-bit data, FIG. 9, via an IPP 251 having a shading correction function, black level correcting function, and light quantity correcting function. These data are selected by a first multiplexer (MUX1) 252, processed by the IPU 225 having a spatial high frequency enhancing (MTF correction) function, speed changing (magnification change) function, gamma correcting function, and data depth converting function (eight bits/four bits/1 bit), and then sent to a printer PR via a third multiplexer (MUX3) 254. Designated by the reference numeral 255 is a memory device (MEM).

Figure 10:
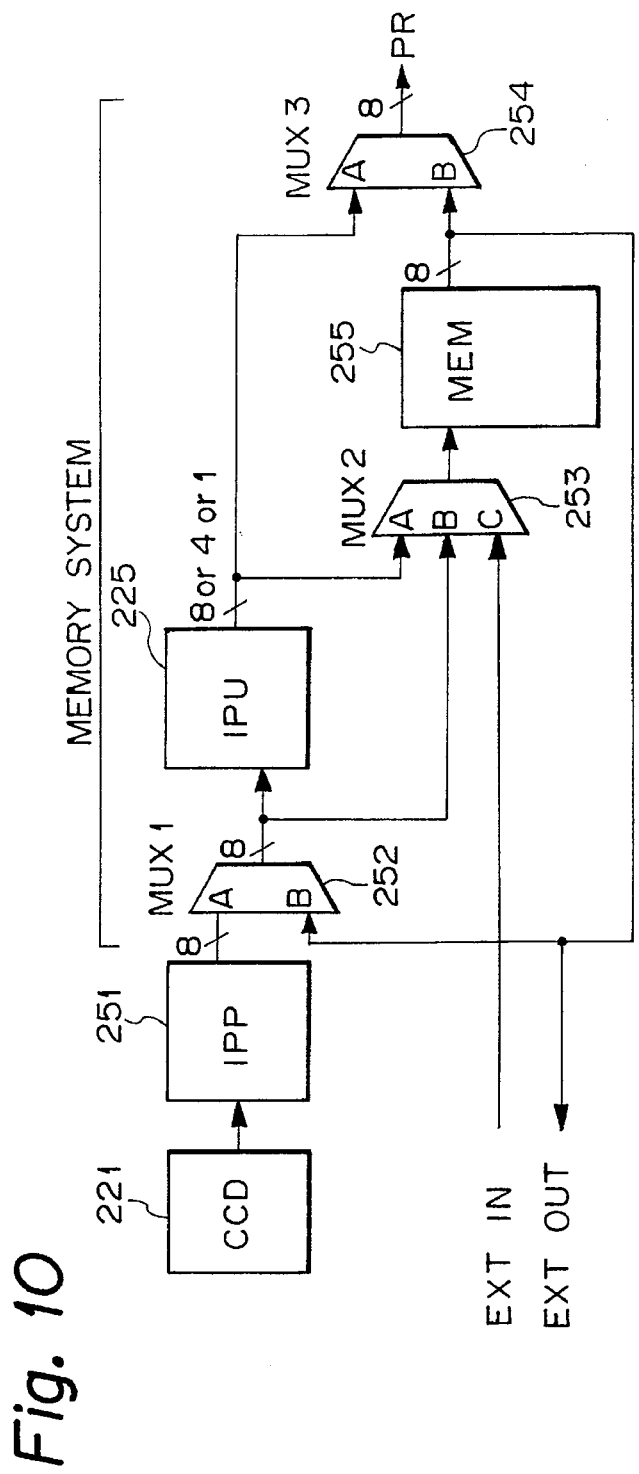
FIG. 10 is a block diagram schematically showing a memory system included in the control unit.
Figure 11:
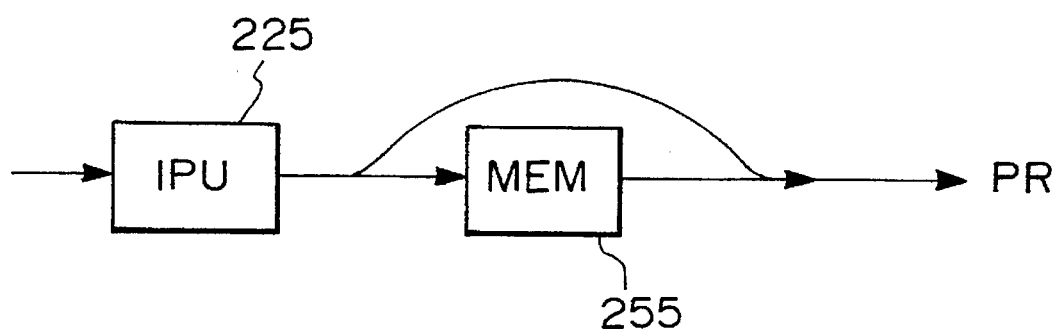
FIG. 11 demonstrates a system wherein image data from the image processing unit are once written to a memory device included in the memory system.
Figure 12:
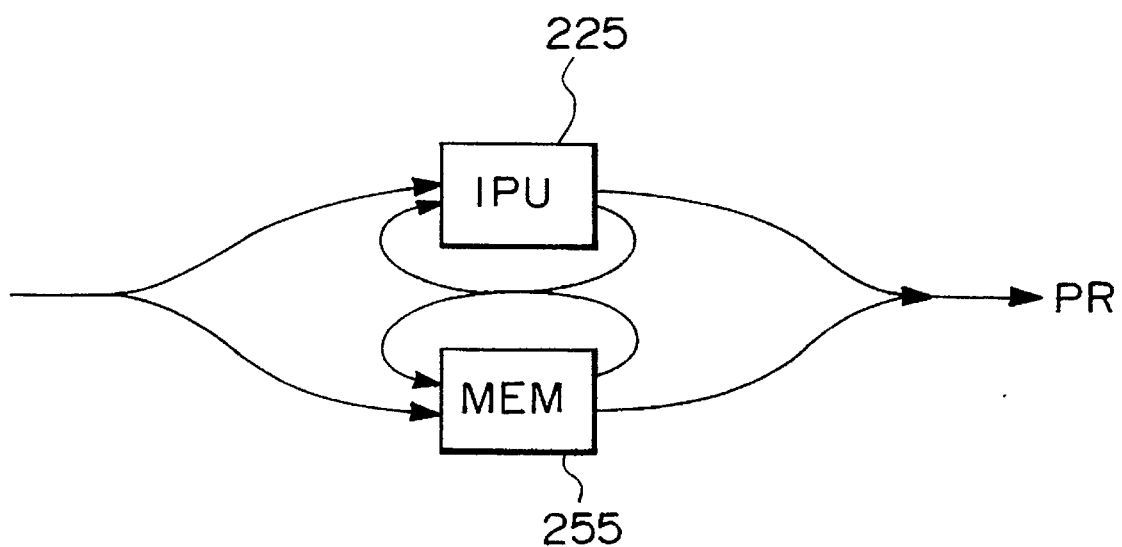
FIG. 12 shows a system wherein processed image data and raw data from the image processing unit both are written to the memory device.

As shown in FIG. 11, it has been customary to write the image data from the IPU 225 in the MEM 255 and transfers them from the MEM 255 to the PR, as needed. It has also been customary to write the image data in the MEM 255 while sending them to the PR at the same time and to implement the second and successive copies with image data stored in the MEM 255. The embodiment allows data to flow as shown in FIG. 12, so that both the processed data and the raw data from the IPU 225 may be written to the MEM 255. For this purpose, three multiplexers (MUX1, MUX2 and MUX3) shown in FIG. 10 are switched over to change the flow of the data. For example, to produce a plurality of copies by a single scanning step while changing the parameter of the IPU 225:

(a) When the scanner scans a document, a single copy is output with the MUX1, MUX2 and MUX3 selecting A, B and A, respectively. In this condition, raw data are written to the MEM 255 via the MUX2; and (b) For the second and successive copies, the MUX1 selects B to transfer the data from the MEM 255 to the IPU 225 and therefrom to the PR via the MUX3. Every time a copy is produced, the parameter of the IPU 225 is changed.

To store one-bit data or similar compact data, the MUX1 selects A so as to write the output of the IPU 225 in the MEM 255. In this case, the PR selects a bilevel data (one bit) mode. In FIG. 10, labeled EXT IN and EXT OUT are image data received from the outside and image data to be sent to the outside.

Figure 13:
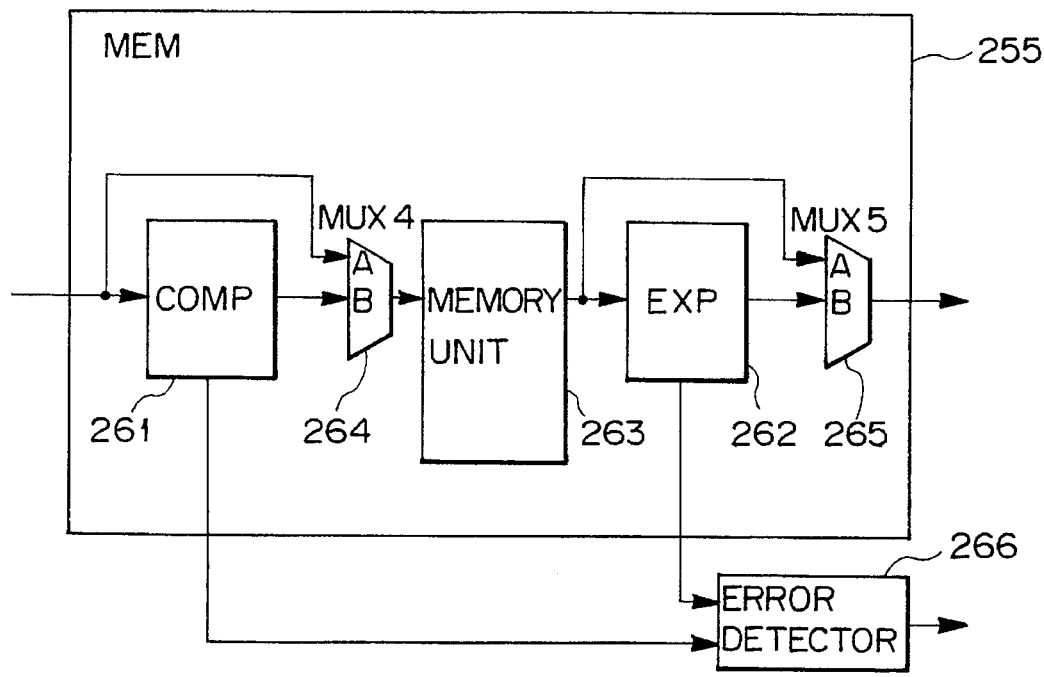
FIG. 13 is a block diagram schematically showing a specific construction of the memory device.

A specific construction of the MEM 255 will be described with reference to FIG. 13. As shown, the MEM 255 has a compressor (COMP) 261 and an expander (EXP) 262 respectively preceding and following a memory unit 263, so that not only actual data but also compressed data may be written to the memory unit 263. The prerequisite with this configuration is that the COMP 261 and the EXP 262 be respectively operated speeds matching the speeds of the scanner and printer. To store actual data in the memory unit 263, a MUX4 264 and a MUX5 265 both select A; to store compressed data, they select B. The reference numeral 266 designates an error detector.

Figure 14:
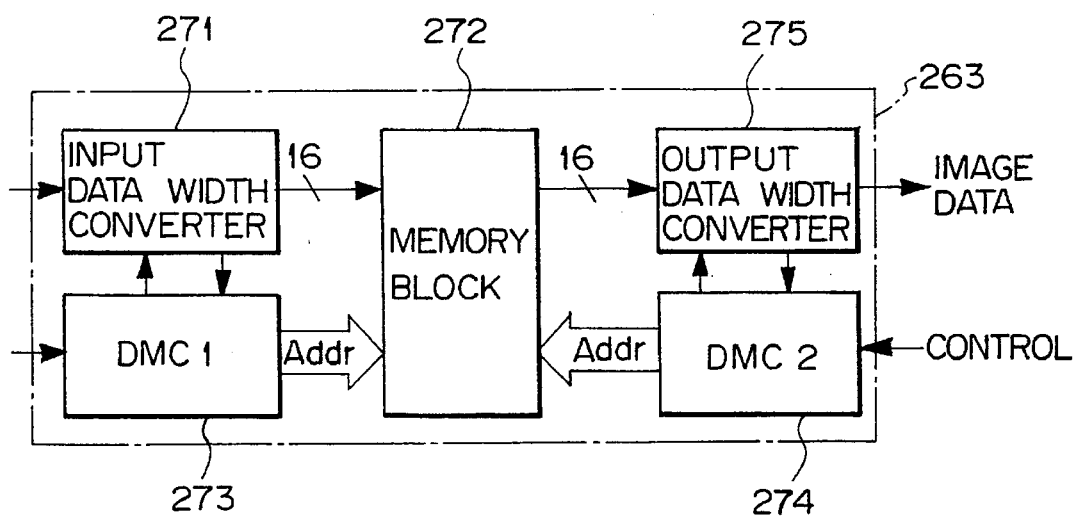
FIG. 14 is a schematic block diagram showing a memory unit included in the memory device of FIG. 13.

As shown in FIG. 14, the memory unit 263 has a memory block 272 and two data width converters, i.e., an input data width converter 271 and an output data width converter 275 respectively connected to the input and the output of the memory block 272. These converters 271 and 275 allow the memory unit 263 to deal with both the three different image types shown in FIG. 15 and the compressed data or code data. Direct memory controllers (DMA1 and DMA2) 273 and 274 read and write data in the predetermined addresses of the memory block 272 matching the number of packed data and the memory data width. Usually, the rate of image data from the scanner or to the printer remains constant without regard to the data type, i.e., eight-bit data, four-bit data or one-bit data. That is, the period of a single pixel is fixed in an apparatus.

In the illustrative embodiment, the data are sequentially defined as one-bit data, four-bit data and eight-bit data from the MSB (Most Significant Bit) side of the eight data lines. The input data width modulator 271 and output data width modulator 275 respectively pack and unpack such data in and from the data width (sixteen bits) of the memory block 272. By packing data, it is possible to use a memory matching a data depth and, therefore, to promote the efficient use of the memory device 255.

Figure 16:
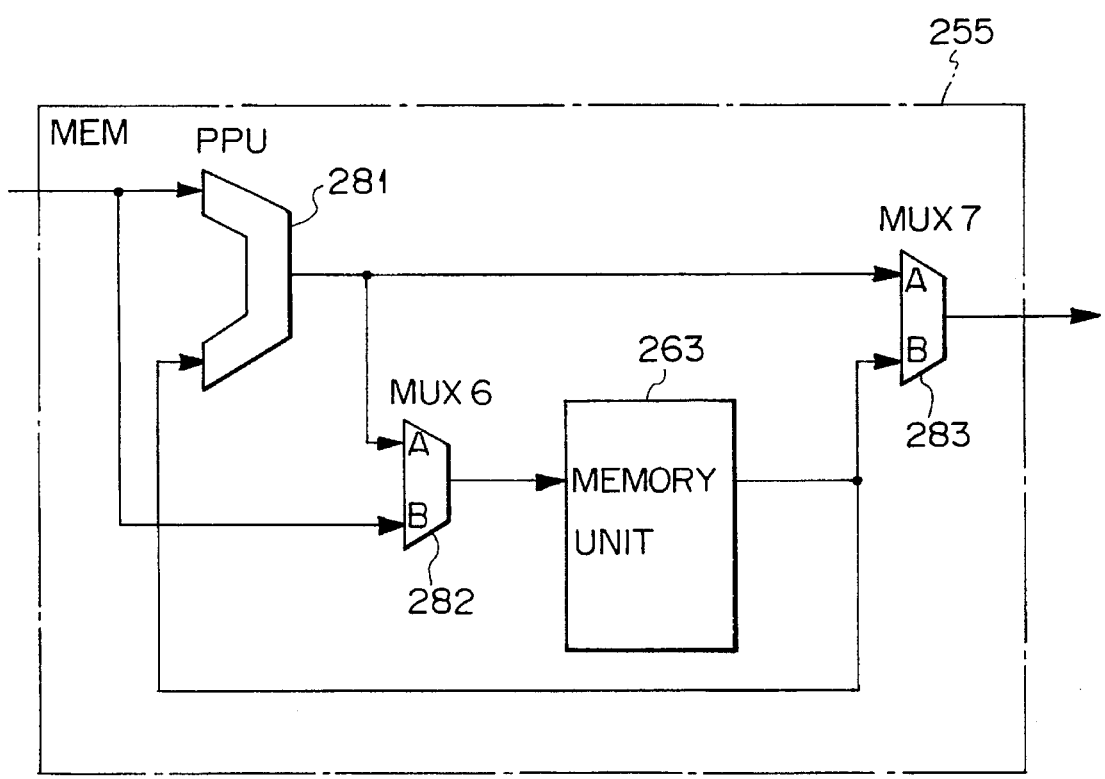
FIG. 16 is a block diagram schematically showing another specific construction of the memory device.

Another specific construction of the memory unit is shown in FIG. 16. As shown, the MEM 255 has a PPU (Pixel Processing Unit) 281 in place of the COMP 261 and EXP 262. The PPU 281 is a unit capable of implementing logical operations (e.g., ANDing, ORing, EORing and NOTing) with the image data. Specifically, the PPU 281 is capable of performing logical operations with the memory output data and input data and sending the resulting data to the printer or writing the resulting data again in the memory unit 263.

The printer, or destination of the data, and the memory unit 263 are switched over by a MUX6 282 and a MUX7 283. This kind of function is usually used to combine images, e.g., to store overlay data in the memory unit 263 and lay them over scanner data.

Figure 17:
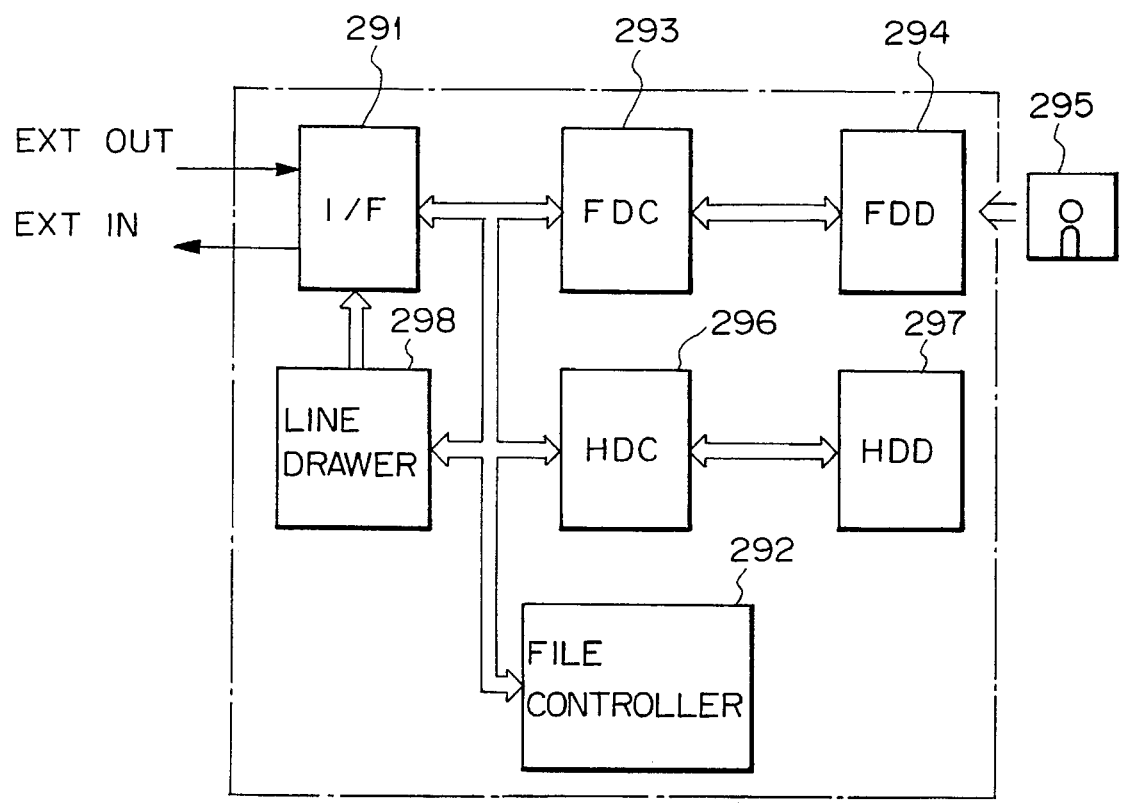
FIG. 17 is a block diagram showing an arrangement for storing image data by using an external storage.

FIG. 17 shows a specific construction wherein image data are stored by use of an external memory device. As shown, a floppy disk 295 is mounted to a floppy disk drive (FDD) 294. To write image data in the floppy disk 295, the image data from the EXT OUT, FIG. 10, are sent to a floppy disk controller (FDC) 293 via an interface (I/F) 291 under the control of a file controller 292. As a result, the image data are written to the floppy disk 295. The file controller 292 also controls a hard disk controller (HDC) 296 and a hard disk drive (HDD) 297, so that image data may be written and read out of a hard disk. The HD)l) 297 stores format data and overlay data to be used often. The reference numeral 298 designates a line drawer.

Figure 18:
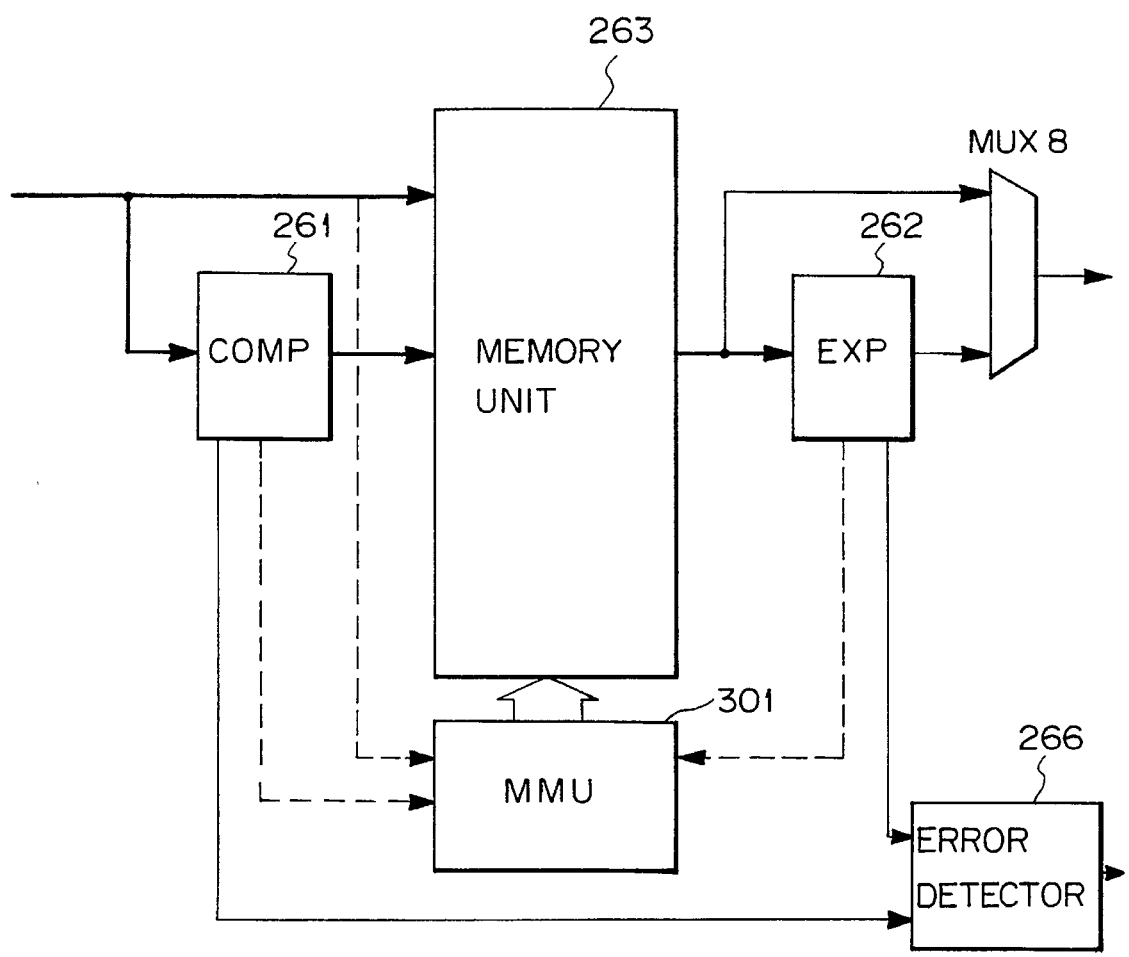
FIG. 18 is a block diagram schematically showing still another specific construction of the memory device.

Referring to FIG. 18, another specific configuration of the memory device will be described. The MEM 255 to be described is capable of effecting a 100% recovery when the compression speed and expansion speed were short. As shown, compressed data and image data are input to the memory unit 263 at the same time as scanning. While the two kinds of input data are each written to a particular memory area, the compressed data are directly applied to the EXP 262 and expanded thereby. Assume that the processing of the COMP 261 and that of the EXP 262 were in time and completed before the entry of one full page of data in the memory unit 263. Then, only the memory area assigned to the compressed data is left while the area assigned to the raw data is cancelled. When the error detector 266 detects an error signal output from the COMP 261 or EXP 262, the data area for the compressed data is cancelled immediately, and the raw data are used. A memory managing unit (MMU) 301 controls the memory unit 263 such that two input data and one output data can be input and output at the same time. By checking the COMP 261 and EXP 262 on a real time basis, it is possible to achieve rapid and sure processing and to promote the efficient use of the memory area. While the specific configuration allocates memory areas dynamically with the MMU 301, use may be made of two memory units assigned to the raw data and the compressed data, respectively. The device of FIG. 18 is feasible for applications of the kind which should satisfy both the number of pages to be stored and the printing speed, e.g., electronic sorting which stores a plurality of pages and sends them to a printer by real time processing.

Figure 19:
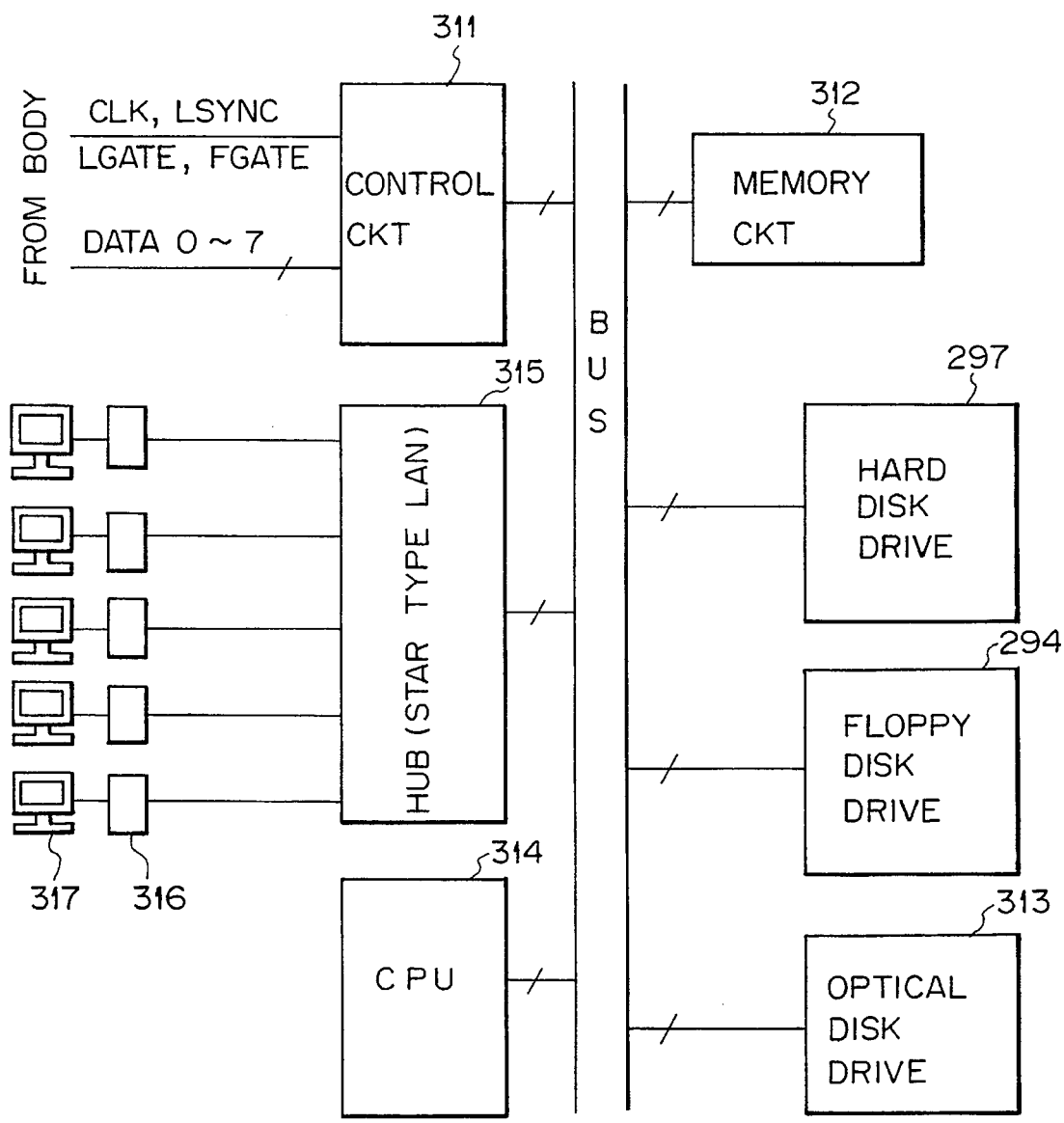
FIG. 19 is a schematic block diagram of a system section included in the control unit.

A reference will be made to FIGS. 19–21 for describing a system section. As shown, a control circuit 311 receives image data and control signals from the apparatus body and converts them. A memory circuit 312 temporarily saves the converted image signals for the following reason. Generally, since the access speed available with a hard disk is low and cannot follow the reading speed of a scanner. To eliminate this problem, a temporary buffer memory is necessary. A hard disk drive 297 writes the converted image data and document data in a hard disk. A floppy disk drive 294 is used to temporarily store image data and document data and and may be transported to another location. An optical disk drive 313 is used to transport a great amount of image data and document data to a remote place or to store such data permanently. A CPU 3 14 controls the entire system. A circuit 315 constructs a network and has, in the specific configuration, a line integrating function, i.e., a function called a hub in a star type LAN architecture. LAN controllers 316 each connects a respective station or terminal 317 to the hub 315. The star type LAN architecture may be replaced with a bus type LAN arrangement, if desired.

A star type LAN has a simple configuration using twisted pair wires and has a transmission rate which is as low as 1 megabits per second. However, this kind of LAN is extensively used with personal computers since it can use existing subscriber lines. While a bus type LAN has a high transmission rate of 10 megabits per second, it is expensive since it needs optical cables or similar exclusive wirings and distributors.

Figure 20:
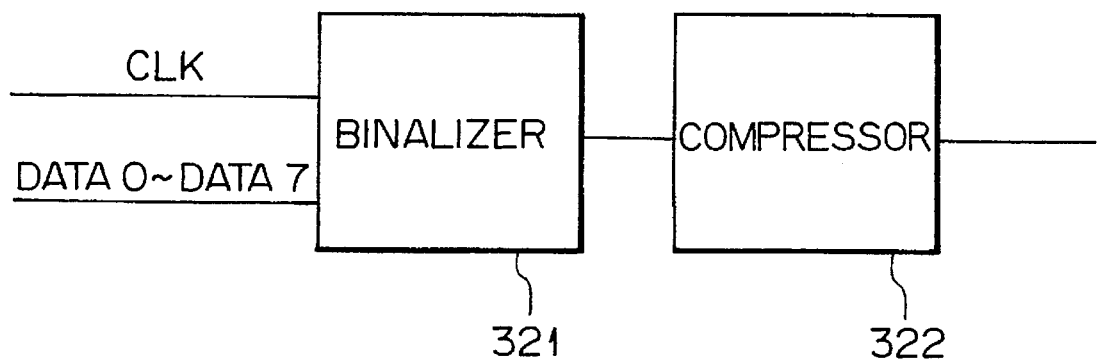
FIG. 20 is a schematic block diagram of a control circuit included in the system section.
Figure 21:
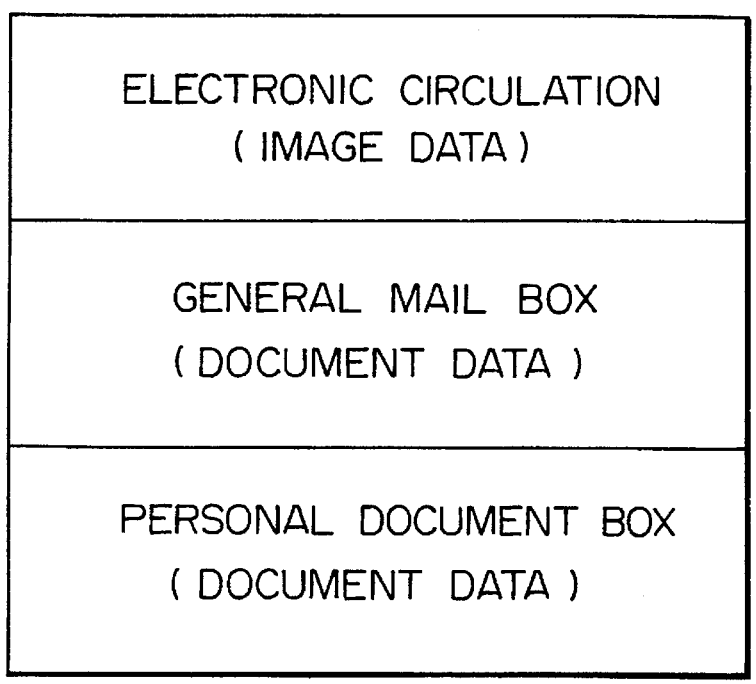
FIG. 21 shows storage areas defined in a hard disk.

As shown in FIG. 20, the control circuit 311 has a binarizer 321 and a compressor 322. The binarizer 321 binarizes the 8-bit signals or image data DATA0–DATA7 by using suitable threshold. The compressor 322 removes black portions and other needless portions represented by the input data, thereby reducing the data size. When a single black-and-white document of A4 size is read at a rate of 400 dots per inch (dpi), sixteen megabytes of data are output. Such data are binarized and reduced to one-tenth with the result that the amount of data is reduced to 200 kilobytes. This successfully saves the capacity of the memory and enhances rapid data transmission.

While the embodiment deals with image data and document data, the capacity of a hard disk is open to choice, as follows. As shown in FIG. 21, a hard disk is divided into an electronic circulation (image data), a general main box (document data), and a personal document box (document data). The electronic circulation stores image data output from the scanner and then binarized and compressed by the control circuit 311. The general mail box allows documents input from any station 9 to be circulated among users. The difference between the electronic circulation and the general main box is that the former handles circulations in the form of sheets while the latter handles code data. In the future, all the data will be dealt with as codes and directly transferred from one station to another station. However, in the transitional stage, image data and code data are expected to exist at the same time. The personal document box plays the role of a location for storing personal documents. The difference between the general main box and the personal main box is that the former is relatively freely accessible to data while the latter allows only the person himself to access data.

Assuming that the electronic circulation is capable of accommodating 1,000 pages, it needs 200 megabytes (see binarization and compression). Assuming that the general main box can accommodate 5,000 pages, and that the number of characters for a page of A4 size is 1,500, then 3 kilobytes for each page (two bytes per character) and, therefore, fifteen megabytes are needed. Assuming that the personal mail box has a capacity corresponding to 1,000 pages, 3 megabytes are necessary. Assuming that the number of users is twenty, 60 megabytes are necessary. As a result, the hard disk needs 275 megabytes in total. The apparatus is basically the same as a product called a file server, the former differs from the latter in the following respects:

(1) The file server has a hard disk whose capacity is as great as one gigabyte to 100 gigabyte, while the embodiment has only a capacity of 300 megabytes;

(2) To save the capacity of the hard disk, the embodiment automatically cancels data which have been read or whose terms have expired; and (3) The file server mainly deals with code data while the embodiment mainly deals with image data.

The floppy disk drive 294 and optical disk drive 313, both of which are external storages, are used to store image data and document data or to transport them to another location. In addition, they may be used to transport a great amount of image data and document data to a remote place or to store data permanently.

An alternative embodiment of the present invention will be described with reference to FIGS. 22–28 as well as to FIGS. 1–3, 7–12, 14–16, 20 and 21. As shown in FIG. 16, the MEM 255 has the PPU 281 located outside of the memory unit 263. The PPU 281 is a unit capable of implementing logical operations (e.g., ANDing, ORing, EORing and NOTing) with the image data. Specifically, the PPU 281 is capable of performing logical operations with the memory output data and input data and sending the resulting data to the printer or writing the resulting data again in the memory unit 263. The printer, or destination of the data, and the memory unit 263 are switched over by the MUX6 282 and MUX7 283. This kind of function is usually used to combine images, e.g., to store overlay data in the memory unit 263 and lay them over scanner data.

Figure 22A:
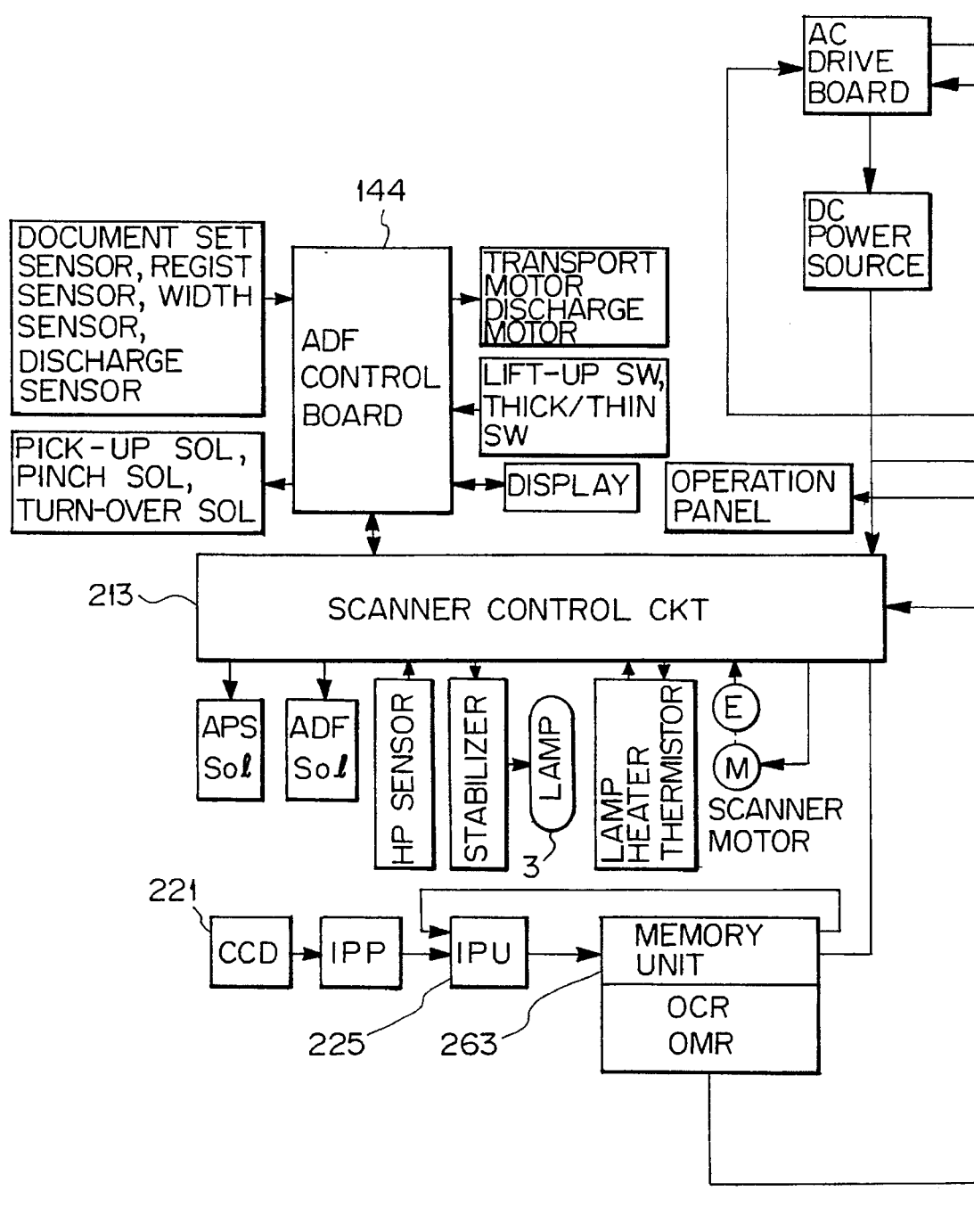
FIG. 22 is a section showing an alternative embodiment of the present invention.
Figure 22B:
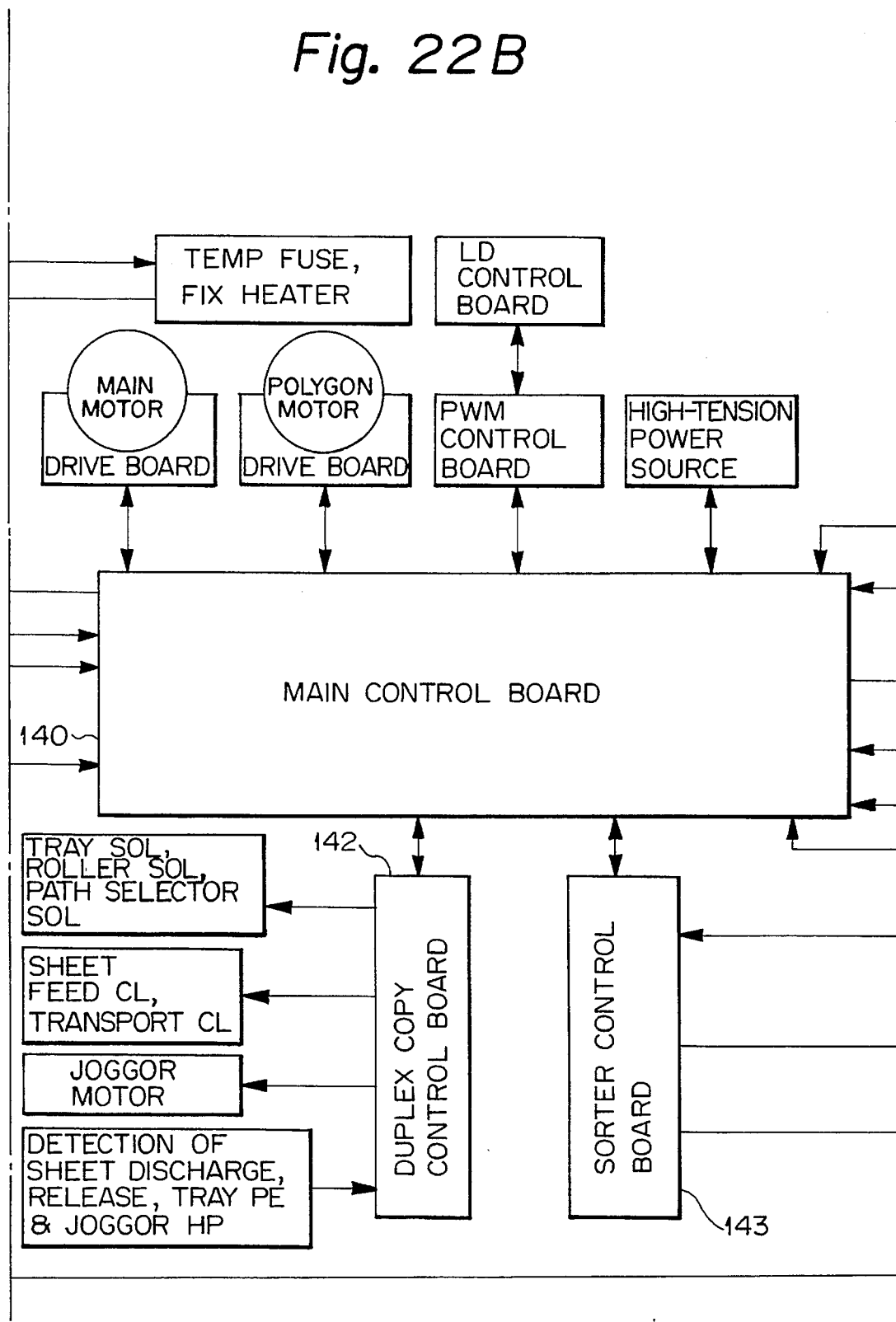
Figure 22C:
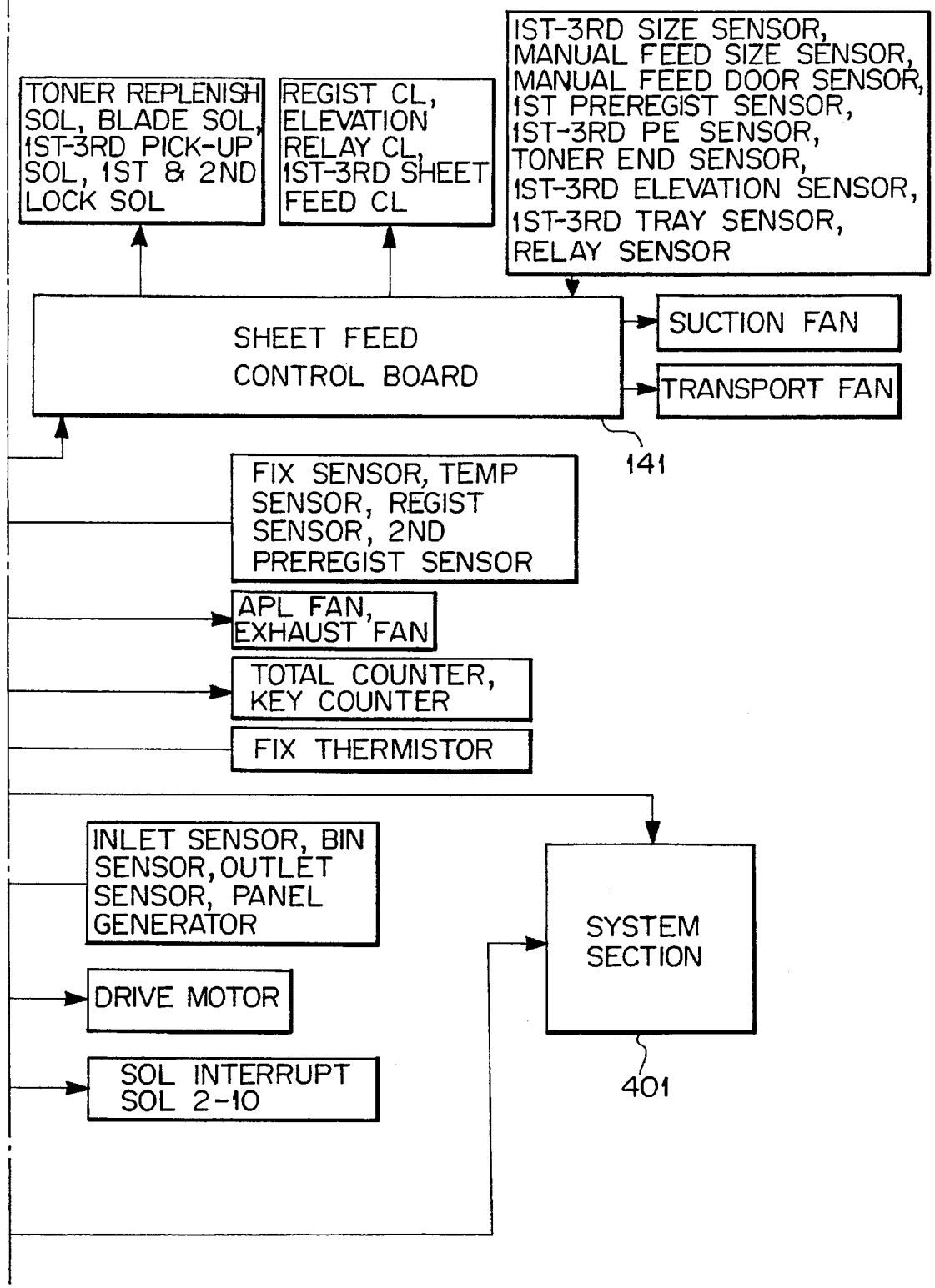
Figure 24:
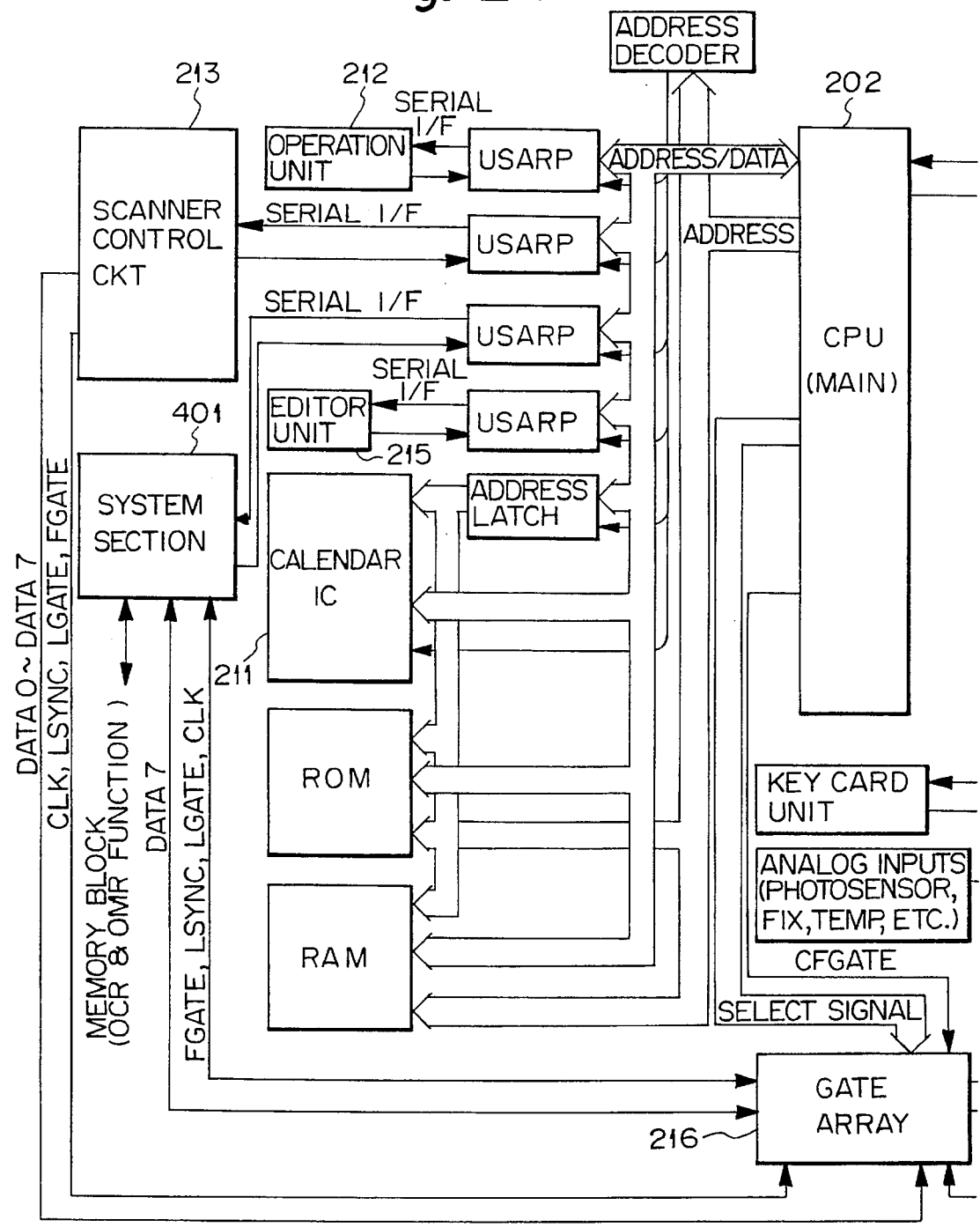
FIGS. 24 and 25 are block diagrams schematically showing, when combined, a more specific construction of a control unit included in the embodiment of FIG. 22.
Figure 25:
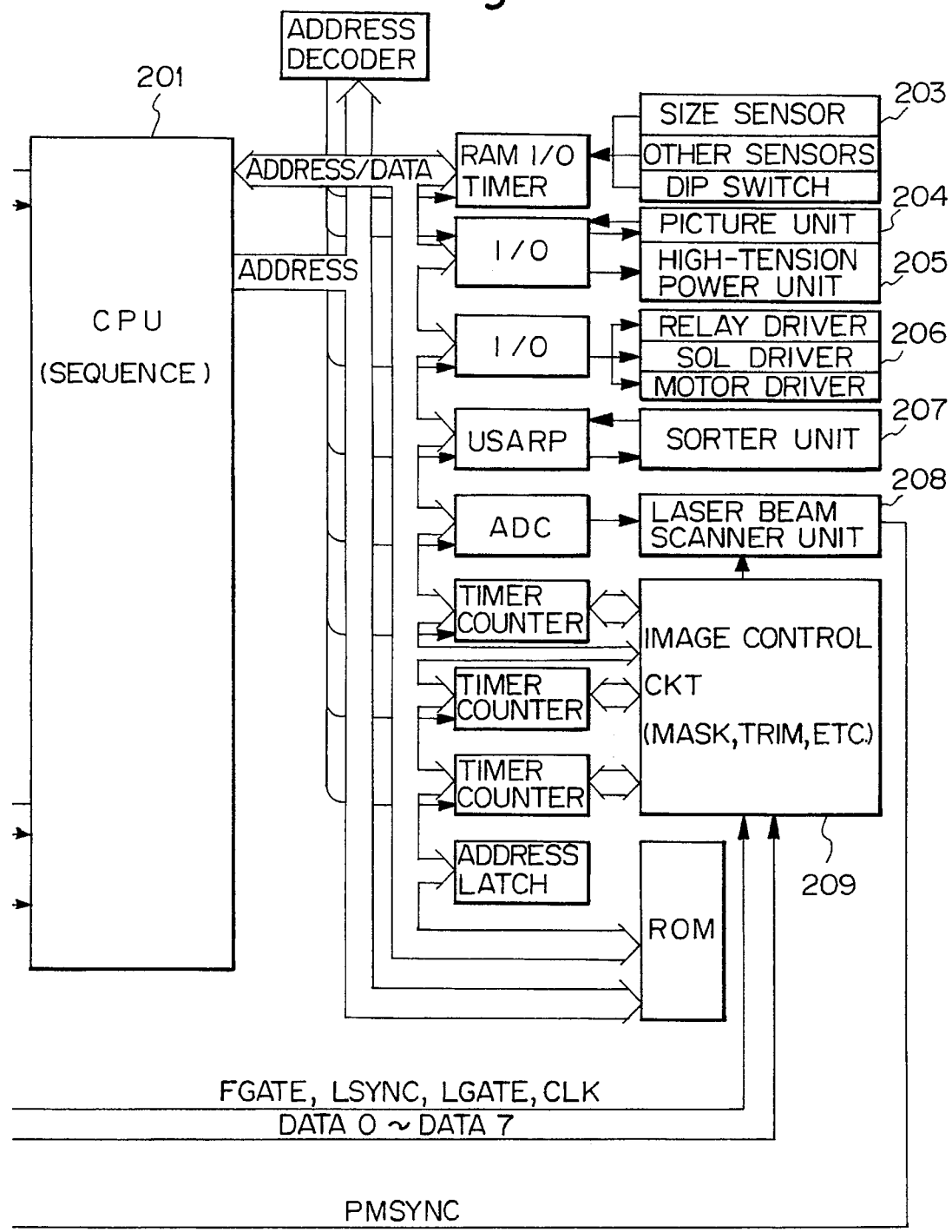

As shown in FIGS. 22, 24 and 25, the gate array 216 sends, in response to a select signal from the main CPU 202, image data (DATA0–DATA7) and synchronizing signals in any of the following three different directions.

(1) Scanner (Control Circuit 213→Image Control Circuit 209

Image signals in the form of eight-bit data (or four-bit or one-bit data, if desired) and serially transferred from the scanner are sent to the image control circuit 209 in synchronism with a synchronizing signal PMSYNC from the laser beam scanner unit 208.

(2) Scanner Control Circuit 213→System Section 401

Image signals in the form of eight-bit data (or four-bit or one-bit data, if desired) and serially transferred from the scanner are fed to a control circuit included in the system section 401.

(3) System Section 401→Image Control Circuit 209

Image data stored ill the system section 401 are serially transferred in the form of eight-bit data to the image control circuit 209 in synchronism with the synchronizing signal PMSYMC from the laser beam scanner unit 208.

Figure 26:
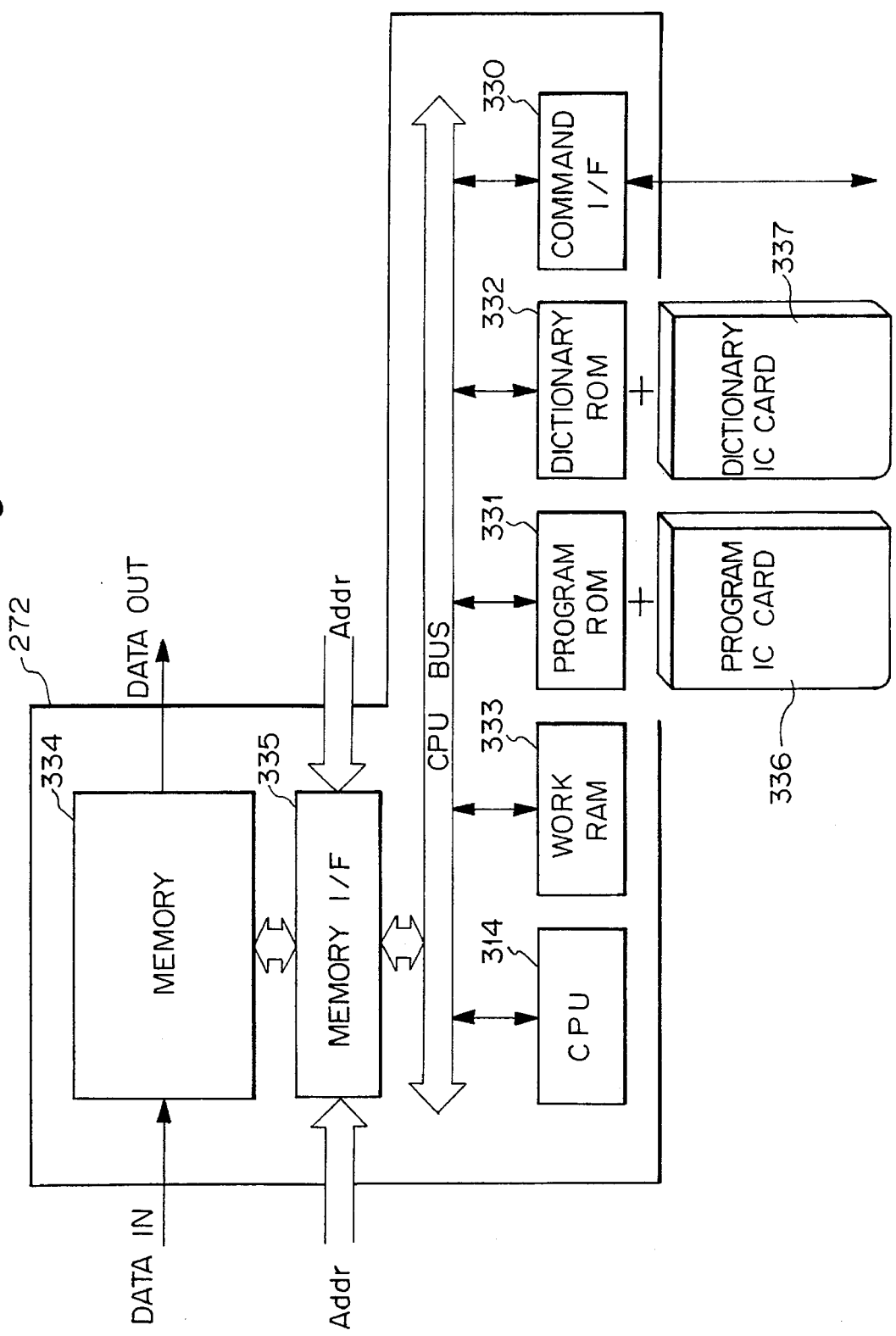
FIG. 26 is a schematic block diagram showing a specific construction of a memory block included in the control unit of the alternative embodiment.

A memory block shown in FIG. 26 is similar to the memory block of FIG. 14 except that it has a CPU 314, a program ROM 331, a dictionary ROM 332, a work RAM 333, a memory 334, and a memory I/F 335 in order to implement the OCR and OMR functions. The reference numerals 336 and 337 designate a program IC card and a dictionary IC card, respectively.

Figure 15:
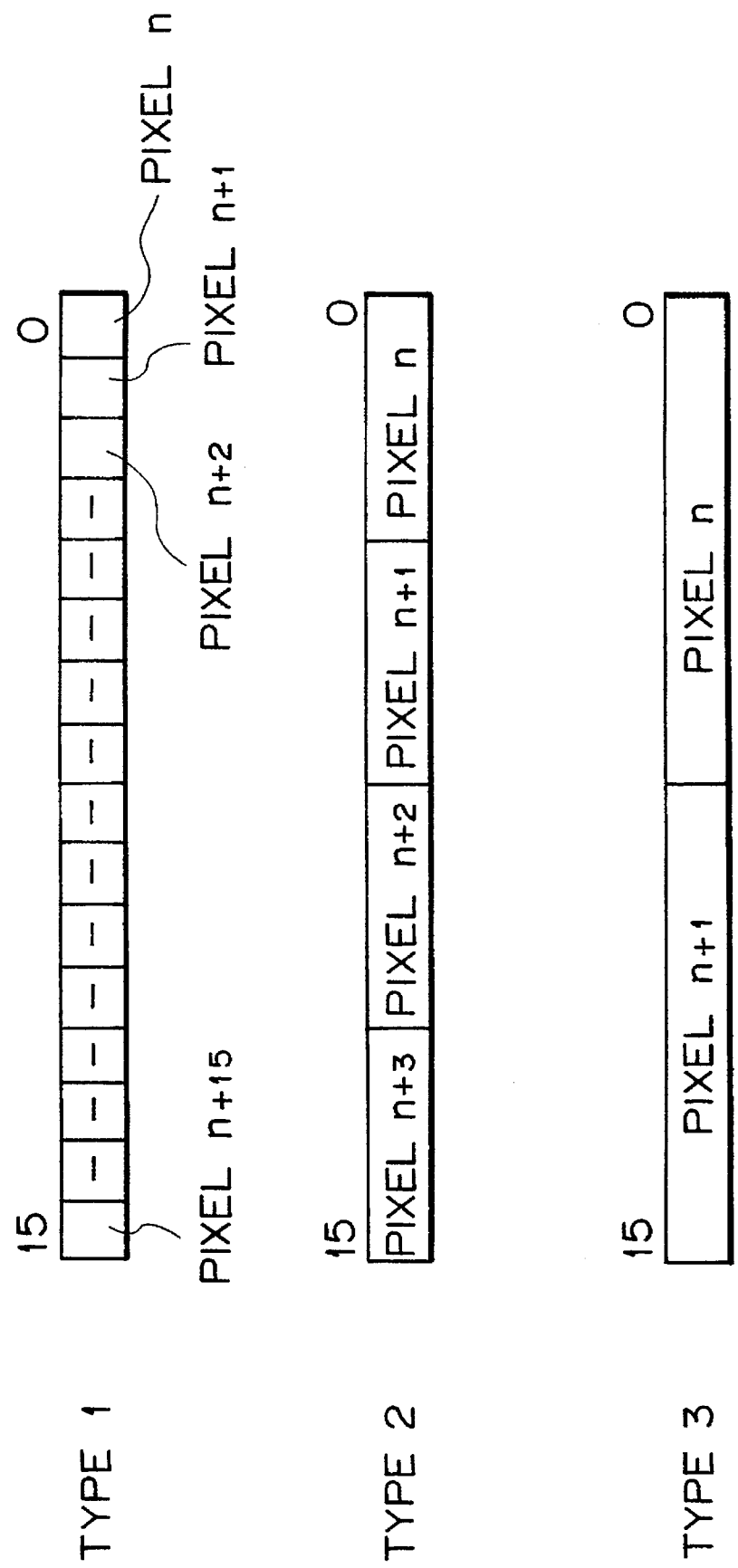
FIG. 15 shows three different image data types.

In the circuit of FIG. 8, the binarized data are written to the memory block 272 of FIG. 14 in the type 1 format shown in FIG. 15. More specifically, the binarized data are written to the memory 334 shown in FIG. 26. According to software stored in the program ROM 331, the CPU 314 determines whether or not a mark is present in the data and extracts the feature of the image data of a particular area, compares it with character patterns stored in the dictionary ROM 332, and converts it to a character code. A plurality of areas can be set for OCR and are commanded by the system side via a command I/F 330. The work RAM 333 is used to temporarily store commands from the system side, store the intermediate result of OCR, and store the result of OMR. Generally, the OCR function is used to search for characters in the particular area indicated by the system, transform them to character codes, and then return them to the system.

Figure 27:
FIG. 27 shows a bar code mark.
Figure 28:
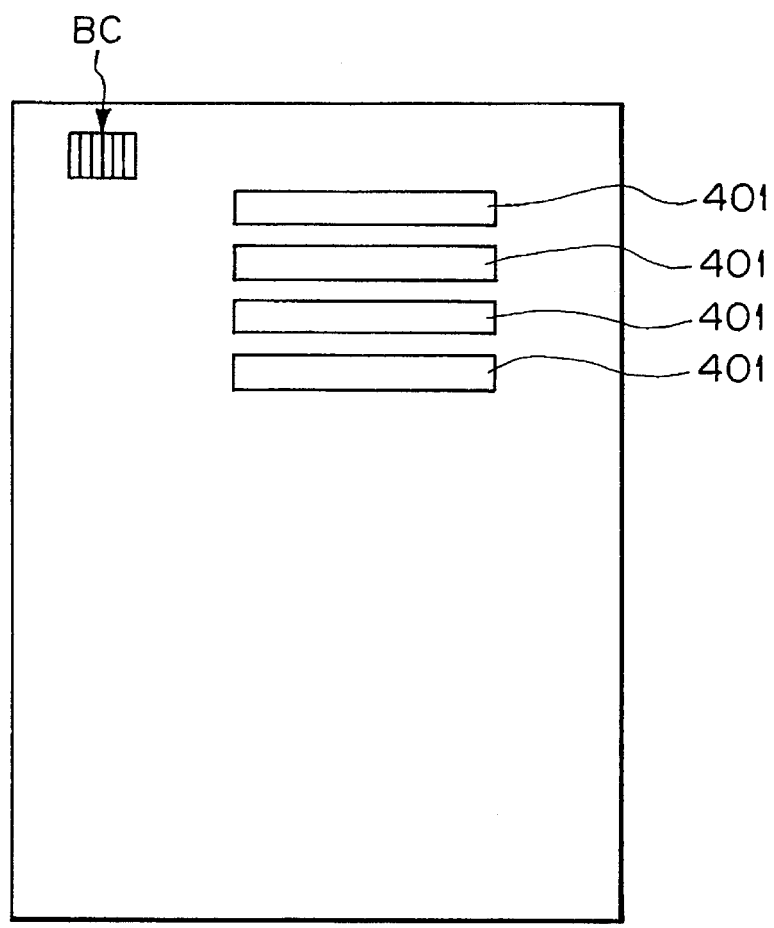
FIG. 28 shows a specific document carrying a bar code mark thereon.

The OMR function searches the memory area in order to detect the content of a bar code BC, such as shown in FIG. 27, and the coordinates of the bar code BC. For example, the system causes the CPU 314 to search for the bar code BC by the OMR function, determines, on the basis of the output code, where and how many data writing areas are available, and then designates the OCR function to take in character codes produced by decoding characters written in the particular area. In another example, the system indicates relative coordinates by using the position of the coordinates of a bar code BC shown in FIG. 28 as an origin, thereby taking in character codes. In FIG. 28, the system indicates four writing areas 401 on the basis of a code included in the bar code BC and representative of the number of areas.

To implement the OCR function in foreign languages, IC cards or similar media may each store a dictionary and replaced with each other.

Figure 23:
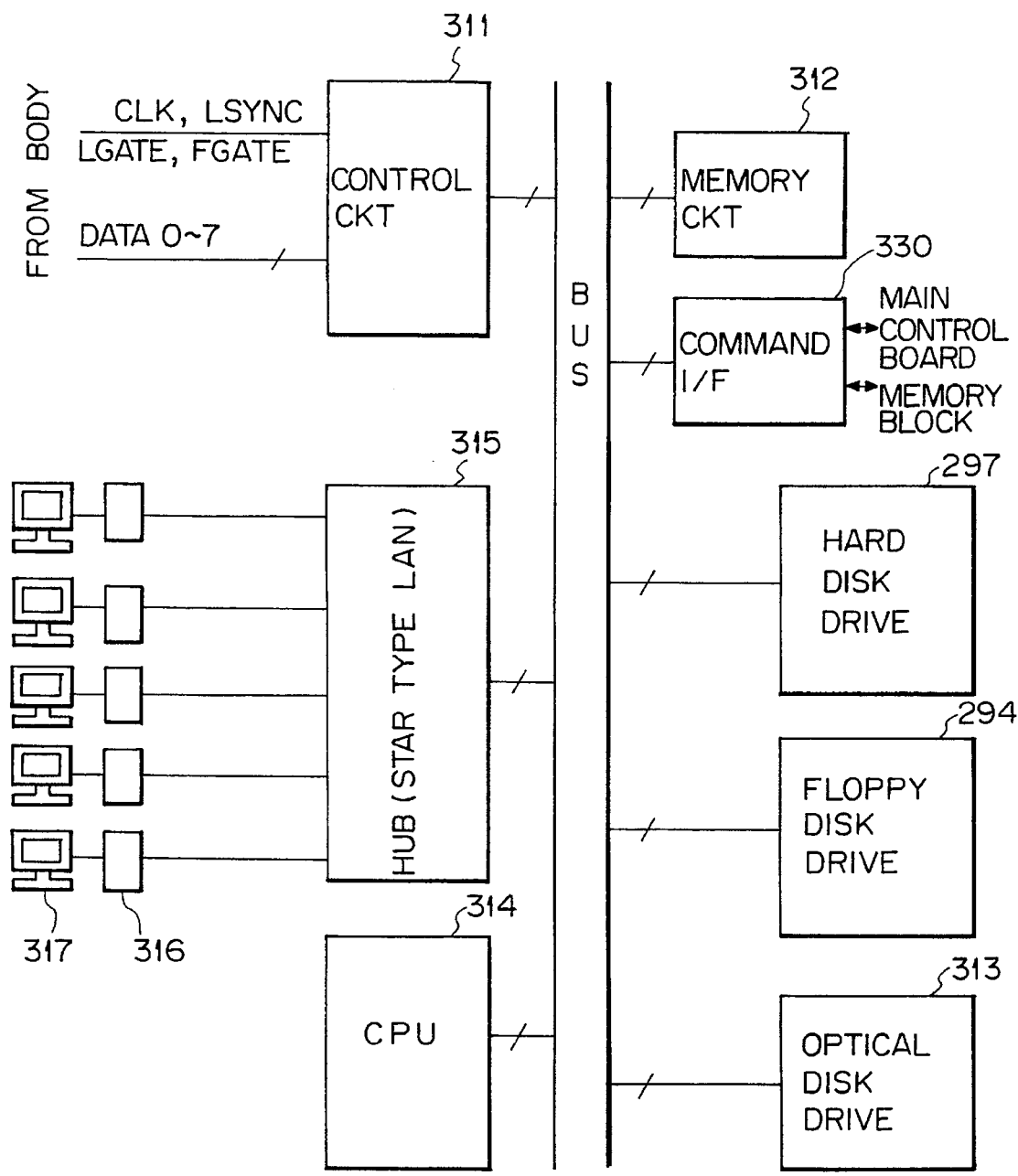
FIG. 23 is a block diagram schematically showing a system section included in the alternative embodiment.

The relation between the OCR and OMR function means shown in FIG. 23 and the system section 401 is shown in FIG. 22. Image data read by the CCD image sensor 221 are once written to the memory unit 263 of FIG. 14 via the IPP and IPU 255. The memory block 272 shown in FIG. 26 examines the stored image data to search For character images and then transforms them to character codes (OCR function). Further, the memory block 272 searches for a particular image pattern, e.g., bar code mark shown in FIG. 27 and then outputs the position of the mark and a code representing it (OMR function).

A system section 401 commands the ADF to feed a document and commands the scanner to scan it via the command I/F 330, FIG. 23, and the main control board 140, FIG. 22. At the same time, the system section 401 commands OCR with the data area of the memory block 272 designated via the command I/F 330. The memory block 272 searches for the bar code mark by the OMR function, reads the code, and interprets a location For OCR and the meaning of character data according to the OCR format indicated by the code. The OCR format is provided with, for example, the user's name, circulation term, keyword, title, and whether or not automatic distribution should be effected.

(1) The user's name indicates the address of stored image data and gives a permission to report and circulate. The user's name may indicate a user group or a terminal itself, if desired.

(2) The circulation term indicates a period of time for which the stored image data should be preserved. The circulation term is compared with a timepiece included in the system and used to effect automatic deletion and to inform a system operator of the permission to delete.

(3) The keyword is used to effect registration and circulation to a user related to the keyword beforehand.

(4) When the OCR function is not available, the title is implemented by image data themselves as an image title. At a terminal, the title is used to display and search titles, to output a list of stored image documents at output means, and to allow the system operator to manage image documents.

(5) With the automatic distribution, it is possible to distribute image documents, but not circulate them, by adding marks thereto. When the system determines that a terminal has accessed it, the system automatically downloads an image document to the terminal.

In summary, it will be seen that the present invention provides a document circulating apparatus having various unprecedented advantages, as enumerated below.

(1) The apparatus has a function of deleting particular data automatically and can, therefore, use a limited memory capacity efficiently.

(2) The apparatus has a function of determining whether or not users have each accessed presented data. With this function, it is possible to determine whether or not presented data are transferred to users who need it.

(3) Since the term for presenting data or the date for deleting them can be designated, data of the kind which will become needless soon can be discarded efficiently. This prevents needless data from being accumulated.

(4) Data whose presenting term or deleting date has expired are printed out to inform the user of such data. Hence, data necessary for the user are prevented from being deleted before the user confirms them.

(5) The apparatus can designate users to access, depending on the kind of data. This obviates the flooding of data and allows each user to manage only the data necessary for the user.

(6) After the transfer of data, the apparatus deletes them and stores new data in a memory efficiently.

(7) Even when a presenting term or a deleting date is not specified, data necessary for a user are prevented from being deleted before user's confirmation. This also allows new data to be written to memory efficiently.

(8) By adding a header to data to be input from the apparatus, it is possible for the user to manage data in a desired way in matching relation to the user's object (e.g., type of occupation) and the conditions of use.

(9) The apparatus, having a function of managing data automatically, can store documents sequentially in an optical disk memory, the oldest one being first. Hence, a memory in a network can be used efficiently without resorting to troublesome management.

(10) Needless data representing a document whose circulation term has expired can be deleted from the memory in the network. This also promotes the efficient use of a memory.

(11) When the circulation state of the designated person for circulation is added, needless documents can be transferred from the network to an optical disk more efficiently. This also promotes the efficient use of a memory.

(12) Data necessary for a user can be surely preserved.

(13) When the remaining capacity of an optical disk is short, a user is informed of it and can replace the disk efficiently. As a result, the disk is prevented from overflowing.

(14) When the remaining capacity of an optical disk is too small to store the next data, the data received are printed out and prevented from being lost.

(15) Even when the remaining capacity of an optical disk is too small to store the next data, old documents, documents to be circulated only occasionally and documents which are not important are automatically deleted to accommodate new data.

(16) Data to be deleted are printed out to implement the user's last checking.

(17) Image data are automatically supervised. In addition, the circulation can be managed based on the content of image data and without resorting to complicated manipulation.

(18) Only if documents are stacked on an ADF and then the apparatus is started up, input can be completed by OCR

(19) The area to effect OCR and the meaning of data stored there differ from one image document to another image document if a designated format is not used. However, by using a mark detecting function (OMR), it is possible to interpret a format when a mark is detected and, therefore, to adapt the OCR function to various document formats.

(20) Users to which a document should be transferred are selected on the basis of the content of the document, so that wasteful transfer is obviated.

(21) A user group to which a document is to be transferred determined on the basis of the content. Hence, it is not necessary to select users each time.

(22) A user group can be set by the apparatus.

(23) If keywords, e.g., genres and sections are assigned to personal users, the destination will be automatically determined when the keywords are entered.

(24) The key words can be set by the apparatus.

(25) After part of image data, i.e., several lines of the first page have been received, a transfer request may be sent if the rest of the data is necessary. This promotes the efficient use of transfer time.

Various modifications will become possible for those skilled in the art after receiving the teachings of the present disclosure without departing from the scope thereof.

What is claimed is:

1. A document circulating apparatus for providing documents to a plurality of terminals comprising:

an image reading device;

storing means for storing image data and document data;

control means for controlling said storing means;

system constructing means for constructing a network system for connecting said plurality of terminals; and image outputting means;

said apparatus automatically deleting, among the image data and the document data stored in said storing means, particular data;

said apparatus managing the access condition of terminals or users in relation to the image data and the document data presented.

2. An apparatus as claimed in claim 1, wherein said apparatus automatically deletes, when a term for presenting the image data and the document data and designated by the user expires or a deleting data is reached, said image data and said document data.

3. An apparatus as claimed in claim 1, wherein even after a designated term for presentation or a deleting date has expired, said apparatus automatically prints out, if the user has not accessed the image data and the document data presented, said image data and said document data as data meant for said user and automatically deletes said image data and said document data stored in said storing means.

4. An apparatus as claimed in claim 1, wherein said apparatus designates the users who should access the image data and the document data indicated and, after all the users have accessed said image data and said document data, automatically deletes said image data and said document data.

5. An apparatus as claimed in claim 1, wherein when a predetermined period of time expires without the users to access the image data and the document data and designated beforehand accessing said image data or said document data, said apparatus prints out said image data and said document data meant for said user and automatically deletes said image data and said document data stored in said storing means even if a deleting date or a term is not designated.

6. An apparatus as claimed in claim 1, wherein said apparatus allows the user to designate a deleting order and deletes, when a hard disk becomes full, the image information and the document information in accordance with said deleting order to thereby store new image data and document data in said hard disk.

7. A document circulating apparatus comprising:

an image reading device;

storing means for storing image data and document data;

control means for controlling said storing means;

system constructing means for constructing a network system; and image outputting means;

said apparatus automatically deleting, among the image data and the document data stored in said storing means, particular data, said apparatus designating terminals or users who should access the image data and the document data presented and managing access condition of the terminals or users.

8. An apparatus as claimed in claim 7, wherein said apparatus automatically deletes, when a term for presenting the image data and the document data and designated by the user expires or a deleting data is reached, said image data and said document data.

9. An apparatus as claimed in claim 7, wherein even after a designated term for presentation or a deleting date has expired, said apparatus automatically prints out, if the user has not accessed the image data and the document data presented, said image data and said document data as data meant for said user and automatically deletes said image data and said document data stored in said storing means.

10. An apparatus as claimed in claim 7, wherein after all the users have accessed said image data and said document data, said apparatus automatically deletes said image data and said document data.

11. An apparatus as claimed in claim 7, wherein when a predetermined period of time expires without the users to access the image data and the document data and designated beforehand accessing said image data or said document data, said apparatus prints out said image data and said document data meant for said user and automatically deletes said image data and said document data stored in said storing means even if a deleting date or a term is not designated.

12. An apparatus as claimed in claim 7, wherein said apparatus allows the users to designate a deleting order and deletes, when a hard disk becomes full, the image information and the document information in accordance with said deleting order to thereby store new image data and document data in said hard disk.

* * * * *